United States Patent
Zembutsu et al.

(10) Patent No.: US 11,099,869 B2
(45) Date of Patent: Aug. 24, 2021

(54) MANAGEMENT OF NETWORK FUNCTIONS VIRTUALIZATION AND ORCHESTRATION APPARATUS, SYSTEM, MANAGEMENT METHOD, AND PROGRAM

(71) Applicant: NEC Corporation, Tokyo (JP)

(72) Inventors: Hajime Zembutsu, Tokyo (JP); Mayo Oohira, Tokyo (JP); Junichi Gokurakuji, Tokyo (JP); Hirokazu Shinozawa, Tokyo (JP); Yoshiki Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 15/546,534

(22) PCT Filed: Jan. 26, 2016

(86) PCT No.: PCT/JP2016/052103
§ 371 (c)(1),
(2) Date: Jul. 26, 2017

(87) PCT Pub. No.: WO2016/121728
PCT Pub. Date: Aug. 4, 2016

(65) Prior Publication Data
US 2018/0011730 A1  Jan. 11, 2018

(30) Foreign Application Priority Data
Jan. 27, 2015  (JP) .............. JP2015-013737

(51) Int. Cl.
*G06F 9/455* (2018.01)
*G06F 11/20* (2006.01)
(Continued)

(52) U.S. Cl.
CPC ............ *G06F 9/45558* (2013.01); *G06F 9/46* (2013.01); *G06F 11/20* (2013.01);
(Continued)

(58) Field of Classification Search
CPC ........ G06F 11/20; G06F 9/45558; G06F 9/46; G06F 2009/4557; G06F 2009/45575;
(Continued)

(56) References Cited

U.S. PATENT DOCUMENTS 8,949,431 B2  2/2015  Bercovici et al.
9,223,604 B2  12/2015  Ichikawa et al.
(Continued)

FOREIGN PATENT DOCUMENTS

CN  101739287 A  6/2010
CN  104081733 A  10/2014
(Continued)

OTHER PUBLICATIONS

ETSI GS NFV-REL 001 V1.1.1 (Jan. 2015), Network Functions Virtualisation (NFV); Resiliency Requirements, Group Specification, European Telecommunications Standards Institute, France, Jan. 1, 2015 (82 pages).
(Continued)

*Primary Examiner* — Meng Ai T An
*Assistant Examiner* — Willy W Huaracha

(57) ABSTRACT

Provided a management apparatus including a maintenance mode setting unit that transitions a first virtualization infrastructure (NFVI0) to a maintenance mode, a mobility control unit that at least instructs a virtualization deployment unit (VDU) on the first virtualization infrastructure in the maintenance mode to move to a second virtualization infrastructure (NFVI1), and a maintenance mode release unit that releases the maintenance mode of the first virtualization infrastructure (NFVI0).

8 Claims, 20 Drawing Sheets

(51) Int. Cl.
*G06F 9/46* (2006.01)
*H04L 12/24* (2006.01)

(52) U.S. Cl.
CPC ........ *H04L 41/0668* (2013.01); *H04L 41/082* (2013.01); *G06F 2009/4557* (2013.01); *G06F 2009/45575* (2013.01); *G06F 2009/45591* (2013.01); *G06F 2009/45595* (2013.01)

(58) Field of Classification Search
CPC . G06F 2009/45591; G06F 2009/45595; H04L 41/0668; H04L 41/082
See application file for complete search history.

(56) References Cited

U.S. PATENT DOCUMENTS

| | | | |
|---|---|---|---|
| 9,489,222 | B2 | 11/2016 | Zlotkin |
| 9,703,585 | B2 | 7/2017 | Bercovici et al. |
| 9,847,915 | B2* | 12/2017 | Ashwood-Smith ..... H04L 49/70 |
| 2010/0268687 | A1* | 10/2010 | Zembutsu ........... G06F 11/2097 707/634 |
| 2013/0054813 | A1 | 2/2013 | Bercovici et al. |
| 2013/0055260 | A1 | 2/2013 | Zlotkin |
| 2013/0198352 | A1 | 8/2013 | Kalyanaraman et al. |
| 2014/0201374 | A1 | 7/2014 | Ashwood-Smith et al. |
| 2014/0208315 | A1 | 7/2014 | Abali et al. |
| 2014/0208329 | A1 | 7/2014 | Abali et al. |
| 2014/0317625 | A1 | 10/2014 | Ichikawa et al. |
| 2014/0337529 | A1* | 11/2014 | Antony ................... H04L 45/22 709/226 |
| 2014/0359343 | A1* | 12/2014 | Fu ....................... G06F 11/2033 714/4.12 |
| 2015/0143372 | A1 | 5/2015 | Bercovici et al. |
| 2015/0278041 | A1* | 10/2015 | Ganesan ............. G06F 11/1484 714/4.11 |
| 2015/0278042 | A1* | 10/2015 | Antony ................. G06F 11/203 714/4.11 |
| 2016/0011900 | A1* | 1/2016 | Reddy ................... G06F 9/4408 718/1 |
| 2016/0013992 | A1* | 1/2016 | Reddy ..................... H04L 67/38 709/224 |
| 2016/0077859 | A1* | 3/2016 | Cropper ................ G06F 9/4418 718/1 |
| 2016/0085560 | A1* | 3/2016 | Gourlay ................ G06F 9/4416 713/2 |
| 2016/0103698 | A1* | 4/2016 | Yang ..................... G06F 11/202 714/4.11 |
| 2016/0142474 | A1 | 5/2016 | Itsumi et al. |
| 2016/0147548 | A1 | 5/2016 | Itsumi et al. |
| 2017/0017512 | A1 | 1/2017 | Csatari et al. |
| 2017/0039120 | A1* | 2/2017 | Ganesan ............. G06F 11/3006 |
| 2017/0177399 | A1 | 6/2017 | Abali et al. |
| 2017/0177408 | A1 | 6/2017 | Abali et al. |
| 2017/0220371 | A1* | 8/2017 | Kosugi ................. G06F 9/5077 |

FOREIGN PATENT DOCUMENTS

| | | |
|---|---|---|
| CN | 106462450 A | 2/2017 |
| JP | 2002-055892 A | 2/2002 |
| JP | 4479930 B2 | 6/2010 |
| WO | WO-2013/084332 A1 | 6/2013 |
| WO | WO-2014/208538 A1 | 12/2014 |
| WO | WO-2014/208661 A1 | 12/2014 |

OTHER PUBLICATIONS

Extended European Search Report issued by the European Patent Office for European Application No. 16743331.7 dated Aug. 1, 2018 (12 pages).

Huawei, "Initial content and consolidated functional requirement from phase 1," ETSI, NFV IFA, 1 a#1, NFVIFA(14)00023, France, Dec. 5, 2014 (15 pages).

Chiba, Y., et al., "Study on Management and Orchestration Function to Ensure Required Service Levels in NFV Environment," The Institute of Electronics, Information and Communication Engineers, IEICE Technical Report, NS2013-247, vol. 113, No. 472, pp. 409-414, 7 pages (Mar. 2014).

Endo, D., et al., "A Study of Operation Support System Architecture for Virtualized Carrier Networks," The Institute of Electronics, Information and Communication Engineers, IEICE Technical Report, ICM2014-28, vol. 114, No. 299, pp. 71-74, 5 pages (Nov. 2014).

ETSI GS NFV-MAN 001 V1.1.1 (Dec. 2014) Network Functions Virtualisation (NFV); Management and Orchestration, 184 pages (Dec. 2014).

Japanese Office Action issued by the Japan Patent Office for Japanese Application No. 2016-572038 dated Jun. 12, 2018 (8 pages).

Korean Office Action issued by the Korean Intellectual Property Office for Korean Application No. 10-2017-7023567 dated Jun. 14, 2018 (15 pages).

ETSI GS NFV 002 V1.1.1 (Oct. 2013) Network Functions Virtualisation (NFV); Architectural Framework, 22 pages.

International Search Report corresponding to PCT/JP2016/052103, 2 pages, dated Apr. 26, 2016.

Korean Grant of Patent issued in Korean Patent Application No. 10-2017-7023567, dated Oct. 30, 2018, (4 pages).

Chinese Notice of Allowance for CN Application No. 201680007558.X dated Dec. 29, 2020 with English Translation.

* cited by examiner

MANAGEMENT OF NETWORK FUNCTIONS VIRTUALIZATION AND ORCHESTRATION APPARATUS, SYSTEM, MANAGEMENT METHOD, AND PROGRAM

CROSS-REFERENCE TO RELATED APPLICATIONS

This application is a national stage application of International Application No. PCT/JP2016/052103 entitled "MANAGEMENT OF NETWORK FUNCTIONS VIRTUALIZATION AND ORCHESTRATION APPARATUS, SYSTEM, MANAGEMENT METHOD, AND PROGRAM," filed on Jan. 26, 2016, which claims the benefit of the priority of Japanese patent application No. 2015-013737, filed on Jan. 27, 2015, the disclosure of which is incorporated herein in its entirety by reference thereto.

The present invention relates to network management and orchestration technology. In particular, it relates to management of network functions virtualization and a management apparatus, a system, an apparatus, a method, and a program that are suitably applied to orchestration.

TECHNICAL FIELD

Background

A system implementing a redundancy configuration by combining a plurality of servers in order to improve reliability is used (reference may be made to PTL 1, for example). In a duplication scheme, two identical server apparatuses are arranged, and when a fault is caused in one (an active server (also called an operating server) of the server apparatuses, the other normal server apparatus (a backup server (also called a standby server) serves as a substitute for the faulty server apparatus. In an N+1 redundancy scheme, a single server apparatus is arranged as a common standby server for N server apparatuses (active servers).

There is known NFV (Network Functions Virtualization) or the like in which network apparatuses and the like are realized as software by using virtualization technology. In NFV, hardware resources (computing, storage, network functions, etc.) of a server are visualized by virtual machines (VMs) implemented on a virtualization layer such as a hypervisor on a server. For example, NFV is realized based on a MANO (Management & Orchestration) architecture.

FIG. 1 is a cited version of FIG. 4 in Chapter 7 in NPL 1, illustrating an NFV reference architecture (an NFV reference architectural framework) defined by the NFV (Network Function Virtualization) ISG (Industry Specification Groups).

VNF (Virtual Network Function) may realize a network function by using software (virtual machine). Examples of the network function include MME (Mobility Management Entity), S-GW (Serving Gateway), and P-GW (PDN (Packet Data Network) Gateway) in EPC (Evolved Packet Core), which is a core network of an LTE (Long Term Evolution) network. A management function called EMS (Element Management System) is defined per VNF.

In the NFV architecture, NFVI (Network Function Virtualization Infrastructure) is a VNF virtualization infrastructure where hardware resources of a physical machine (a server), such as, for computing, storage, or network functions are virtualized in a virtualization layer such as a hypervisor or a container to be flexibly used as virtualized hardware resources such as for virtual computing, virtual storage, or a virtual network.

NFV-Orchestrator (NFVO) (also called an "orchestrator" herein) performs management and orchestration of NFVI and VNFs and realizes network services on NFVI (allocation of resource to VNF and management of VNFs (for example, auto-healing (auto fault reconfiguration), auto-scaling, and lifecycle management of VNF).

VNF-Manager (VNFM) (also called a "virtual network function management units" herein) performs lifecycle management of VNFs (for example, instantiation, update, query, healing, scaling, and termination) and event notification.

Virtualized Infrastructure Manager (VIM) controls an individual NFVI via a virtualization layer (for example, management of resources for computing, storage, and networking, fault monitoring on an individual NFVI, which is an NFV execution infrastructure, and monitoring of resource information).

OSS (Operation Support Systems) outside the NVF framework is a general term for systems (appliances, software, mechanisms, etc.) needed by, for example, a telecommunication operator (carrier) to establish and operate services, for example. BSS (Business Service Systems) is a general term for information systems (appliances, software, mechanisms, etc.) needed by, for example, a telecommunication operator (carrier) to use for charging usage fees, billing, and customer care, for example.

Service, VNF and Infrastructure Description include a VNF Descriptor (VNFD), a VNF Forwarding Graph Descriptor (VNFFGD), a Virtual Link Descriptor, a Physical Network Function Descriptor (PNFD), and the like, which are not illustrated in FIG. 1.

Os-Ma is a reference point between the OSS/BSS and the NFV-MAN (Management and Orchestration) and is used for requests for lifecycle management of network services, requests for lifecycle management of VNFs, forwarding of state information regarding the NFV, exchanges of policy management information, etc. For example, a reference point Or-Vnfm is used for resource-related requests from an individual VNFM (authorization, reservation, allocation, etc.), forwarding of configuration information to an individual VNFM, and collection of state information about an individual VNF.

A reference point Vi-Vnfm is used for resource allocation requests from VNFM and exchange of information about configurations and states of virtual resources, for example.

A reference point Or-Vi is used for requests for resource reservation and allocation from the NFVO and exchange of information about configurations and states of virtual resources, for example.

A reference point Ve-Vnfm is used for requests for VNF lifecycle management between an individual EMS and an individual VNFM and for exchange of configuration and state information, for example.

A reference point Nf-Vi is used for allocation of virtual resources in response to resource allocation requests, forwarding of state information about virtual resources, and exchange of configuration and state information about hardware resources, for example.

A reference point Se-Ma is used for searching for information about an NFV deployment template and NFV Infrastructure information models, for example.

The following describes an example of a relationship among an individual VNF, VNFC (VNF Component), VDU (Virtualization Deployment Unit), and NFVI with reference to FIG. 2. FIG. 2 schematically illustrates an arrangement (a virtualized SGW) which SGW (Serving gateway) in EPC is virtualized as VNF. Namely, FIG. 2 illustrate an example in which a VNFC is set for each of logical interfaces of a VNF configured by virtualizing an SGW (a virtualized SGW). In FIG. 2, VDU is a constituent element used by an information model supporting description of deployment and operation behavior of the VNF in whole or part. As described above, a VNFI providing a VNF execution infrastructure includes virtual computing, virtual storage, virtual networking each virtualized on a virtualization layer such as a hypervisor. In FIG. 2, Vn-Nf represents an execution environment provided by NFVI to VNF.

In FIG. 2 in which an SGW is virtualized as VNF, a VNFC is set per logical interface. Logical interfaces S11, Gxc, and S5/S8-C regarding C-Plane (Control-Plane) are collectively defined as a single VDU (a VM), and logical interfaces S1U and S5/S8-U regarding U-Plane (User-Plane) are collectively defined as a single VDU (a VM). In EPC, S11 is an interface between SGW and MME, and S5/S8 is an interface between SGW and PGW. In addition, S1 is an interface between SGW and eNodeB (an evolved NodeB), and Gxc is an interface between SGW and Policy and Charging Rules Function (PCRF).

The following tables 1 and 2 summarize elements of NFV.

TABLE 1

| Functional Entity | Description |
|---|---|
| OSS/BSS | Comprehensively performs operations/business support. A plurality of EMSs and Orchestrator are deployed on a low-order layer of OSS/BSS. |
| Orchestrator | Orchestration across a plurality of VIMs<br>Management of NS(Network Service) deployment templates and VNF packages<br>Management of instantiation and lifecycle management of NSs<br>Management of instantiation of VNFM<br>Management of VNF instantiation in coordination with VNFM<br>Validation and authorization of NFVI resource request from VNFM<br>Management of integrity and visibility of NS instances through their lifecycle<br>Management of relationship between NS instances and VNF instances, using NFV instances Repository<br>Topology management of NS instances<br>Automated management of NS instances |
| VNF-Manager | Performs VNF lifecycle management * and event notification management.<br>* Instantiation, Auto-Scaling, Auto-Healing, Update, and so on |
| Virtualized Infrastructure Manager (VIM) | Performs resource management and control of NFV infrastructure as follows:<br>Management of computing, storage, and network resources<br>Resource allocation in response to a request<br>Monitoring of a fault state of NFV Infrastructure<br>Monitoring of resource information of NFV Infrastructure |

TABLE 2

| Functional Entity | Description |
|---|---|
| Service VND and Infrastructure Description | Defines information templates that become necessary for deploying each Network Service and each VNF<br>NSD: a template that describes requirements and constraint conditions necessary for deployment of the NS |

TABLE 2-continued

| Functional Entity | Description |
|---|---|
| | VLD: describes resource requirements of a logical link connecting VNFs or connecting PNFs that constitute NS<br>VNFGD: a template that describes a logical topology for and assignment of NS<br>VNFD: a template that describes requirements and constraint conditions necessary for deploying VNF<br>PNFD: describes, for a physical network function, connectivity, external interface, and KPIs requirements of aVL. |
| NS Catalogue | Repository of NSs<br>Management of NS deployment templates (NSD, VLD, VNFFGD) |
| VNF Catalogue | Describes repository of each VNF.<br>Management of each VNF package (VNFD, software images, manifest files, etc.) |
| NFV Instances Repository | Holds instance information of all the VNFs and all the NSs.<br>Information on each instance is described in Record.<br>Record is updated according to lifecycle of each instance. |
| NFVI Resources Repository | Holds information of NFVI resources (NFVI resources as abstracted by VIM across operator's Infrastructure Domains) that are available/reserved/allocated, for abstraction |
| VNF | Refers to a virtualized Network Function and refers to a VM (e.g., MME, SGW, PGW or the like) in which an EPC application is installed, being configured with VNF. |
| EMS | Manages FCAPS for VNFs. (FCAPS: Fault, Configuration, Accounting, Performance and Security) |
| NFVI | Serves as a resource infrastructure on which VNFs are executed and comprises computing, storage and network functions.<br>A hypervisor abstracts physical resources, and VIM manages and controls the abstracted resources and provides VNF with the resources. |

CITATION LIST

Patent Literature

[PTL 1] Japanese Patent No. 4479930

Non Patent Literature

[NPL 1] ETSI GS NFV 002 V1.1.1 (2013 October) Network Functions Virtualisation (NFV); Architectural Framework, pp. 13-18, searched on Dec. 25, 2014, Internet <URL: http://www.etsi.org/deliver/etsi_gs/nfv/001_099/002/01.01.01_60/gs_nfv002v010101p.pdf>

SUMMARY

The following describes analysis made by the present inventors.

When a system including a plurality of computer apparatuses is updated, for example, a rolling update and so forth are performed. In a rolling update, updating of software (updating or switching to upgrade software), for example, may be performed without completely stopping the system.

In a virtual machine (VM) implemented on a virtualization layer on a server apparatus (physical machine), there is no need to be concerned with VM service continuity in a rolling update. For example, there may be conceivable in the rolling update, such as, (a) a live migration, wherein VM is moved to another physical machine without stopping a guest OS (operating system) or software operating on the VM, and (b) a system switching scheme implemented by system switching through fault detection or the like in a redundancy configuration, such as a duplication configuration in which an active (Act) VM and a standby (SBY) VM are arranged, or, an N+1 redundancy configuration of VM (N active VMs and a single standby VM are arranged).

However, in the above NFV architecture, regarding the live migration of a VDU deployed on a virtual machine and the system switching scheme, there is not defined cooperation between an individual VIM in NFV-MANO and NFVI that provides a VNF virtualization infrastructure (findings obtained by the present inventors).

Hereinafter, a wholly new technique that solves the above problem will be proposed. This technique can realize efficient cooperation between an individual VIM and NFVI even when the above live migration or system switching method is applied.

It is one of objects of the present invention to provide a management apparatus, a system, a method, and a medium storing a program that can reduce time required for preparation and post-processing of live migration to suppress service interruption or the like.

In addition, it is another object of the present invention to provide a management apparatus, a system, a method, and a medium storing a program that can also suppress service interruption or the like even for a virtual machine that does not have a live migration function, for example.

According to an aspect of the present invention, there is provided a management apparatus, including: a maintenance mode setting unit that transitions a first virtualization infrastructure (NFVI0) to a maintenance mode; a mobility control unit that at least instructs a virtualization deployment unit (VDU) on the first virtualization infrastructure in the maintenance mode to move to a second virtualization infrastructure; and a maintenance mode release unit that releases the maintenance mode of the first virtualization infrastructure (NFVI1).

According to another aspect of the present invention, there is provided a management apparatus, including:

a maintenance mode setting unit that transitions a first virtualization infrastructure (NFVI0) to a maintenance mode;

a system switching control unit that at least instructs system switching between a first virtualization deployment unit (VDU0) of an active system on the first virtualization infrastructure, and a second virtualization deployment unit (VDU1) of a standby system on a second virtualization infrastructure (NFVI1); and a maintenance mode release unit that releases the maintenance mode of the first virtualization infrastructure (NFVI0) after the first virtualization deployment unit (VDU0) of a standby system, moves to a third virtualization infrastructure.

According to another aspect of the present invention, there is provided a network management system, including:

a virtualized infrastructure management apparatus (VIM) that controls an infrastructure(s) (NFVI) on which a virtual machine(s) is executed;

first and second virtualization infrastructures (NFVI0/1); and a terminal or an upper apparatus of the virtualized infrastructure management apparatus (VIM), wherein the virtualized infrastructure management apparatus (VIM) receives a request for transitioning the first virtualization infrastructure to a maintenance mode from the terminal or the upper apparatus, transitions the first virtualization infrastructure (NFVI0) to the maintenance mode, and instructs movement of a virtualization deployment unit (VDU) on the first virtualization infrastructure to the second virtualization infrastructure (NFVI1), and wherein, after the VDU moves to the second virtualization infrastructure and maintenance on the first virtualization infrastructure is finished, the virtualized infrastructure management apparatus (VIM) receives a request for releasing the maintenance mode of the first virtualization infrastructure from the terminal or the upper apparatus and releases the maintenance mode of the first virtualization infrastructure.

According to another aspect of the present invention, there is provided a network management system, including:

a virtualized infrastructure management apparatus (VIM) that controls a network functions virtualization infrastructure(s) (NFVI) on which a virtual machine(s) is executed;

first, second, and third virtualization infrastructures (NFVI);

an upper apparatus of the virtualized infrastructure management unit (VIM); and a terminal, wherein first and second virtualization deployment units (VDUs) on the first and second virtualization infrastructures form a redundancy configuration by serving as active and standby systems, respectively, and wherein, when the virtualized infrastructure management apparatus (VIM) receives a request for transitioning the first virtualization infrastructure to a maintenance mode from the terminal or the upper apparatus, the virtualized infrastructure manager transitions the first virtualization infrastructure to the maintenance mode and notifies the upper apparatus or the terminal of the transitioning, wherein the upper apparatus or the terminal instructs system switching between the first virtualization deployment unit (VDU) on the first virtualization infrastructure and the second virtualization deployment unit (VDU) on the second virtualization infrastructure, wherein, the virtualized infrastructure management apparatus (VIM) receives a system switching completion notification indicating that the first virtualization deployment unit (VDU0) has switched to serve as a standby system and that the second virtualization deployment unit (VDU1) has switched to an active system, and wherein, after the first virtualization deployment unit (VDU) moves to the third virtualization infrastructure and maintenance on the first virtualization infrastructure is performed, the virtualized infrastructure management apparatus (VIM) releases the maintenance mode of the first virtualization infrastructure.

According to another aspect of the present invention, there is provided a management method, including:

transitioning a first virtualization infrastructure (NFVI0), which a maintenance target, to a maintenance mode;

transmitting an instruction for movement of a virtualization deployment unit (VDU) on the first virtualization infrastructure to a second virtualization infrastructure (NFVI1);

receiving a completion notification of the movement of the virtualization deployment unit (VDU) to the second virtualization infrastructure (NFVI1); and releasing the maintenance mode of the first virtualization infrastructure (NFVI0) after maintenance is finished.

According to another aspect of the present invention, there is provided a management method, including:

transitioning a first virtualization infrastructure (NFVI0), which is a maintenance target, to a maintenance mode;

transmitting an instruction for system switching between a first virtualization deployment unit (VDU0) of an active system on the first virtualization infrastructure, and a second virtualization deployment unit (VDU1) of a standby system on a second virtualization infrastructure (NFVI1);

releasing the maintenance mode of the first virtualization infrastructure (NFVI0) after the first and second virtualization deployment units (VDU0) and (VDU1) switch to serve as the standby and active systems, respectively, the first virtualization deployment unit (VDU0) serving as a standby system moves to a third virtualization infrastructure, and maintenance on the first virtualization infrastructure is finished.

According to another aspect of the present invention, there is provided a non-transitory computer-readable recording medium storing therein a program, causing a computer to execute processing comprising:

transitioning a first virtualization infrastructure (NFVI0) to a maintenance mode;

transmitting an instruction for movement of a virtualization deployment unit (VDU) on the first virtualization infrastructure to a second virtualization infrastructure (NFVI1);

receiving a completion notification of the movement of the virtualization deployment unit (VDU) to the second virtualization infrastructure (NFVI1); and releasing the maintenance mode of the first virtualization infrastructure (NFVI0).

According to another aspect of the present invention, there is provided a non-transitory computer-readable recording medium storing therein a program, causing a computer to execute processing comprising:

transitioning a first virtualization infrastructure (NFVI0) to a maintenance mode;

transmitting an instruction for system switching between a first virtualization deployment unit (VDU0) of an active system on the first virtualization infrastructure (NFVI0), and a second virtualization deployment unit (VDU1) of a standby system on a second virtualization infrastructure (NFVI1);

receiving a completion notification of the switching of the first and second virtualization deployment units (VDU0) and (VDU1) to the standby and active systems, respectively; and releasing the maintenance mode of the first virtualization infrastructure (NFVI0) after the first virtualization deployment unit (VDU0) serving as a standby system moves to a third virtualization infrastructure and maintenance on the first virtualization infrastructure is finished. The non-transitory computer-readable recording medium may be such as a semiconductor storage device or a magnetic/optical recording medium) in which the program is stored.

The present invention can realize efficient cooperation between an individual virtualization infrastructure and management apparatus even when live migration, system switching, or the like is applied. For example, the present invention can suppress service interruption or the like by reducing time required for preparation and post-processing of live migration.

In addition, the present invention can realize system switching without service interruption even for a virtual machine that does not have a live migration function.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Several Exemplary embodiments of the present invention will hereinafter be described.

<Exemplary Basic Mode 1>

Figure 19:
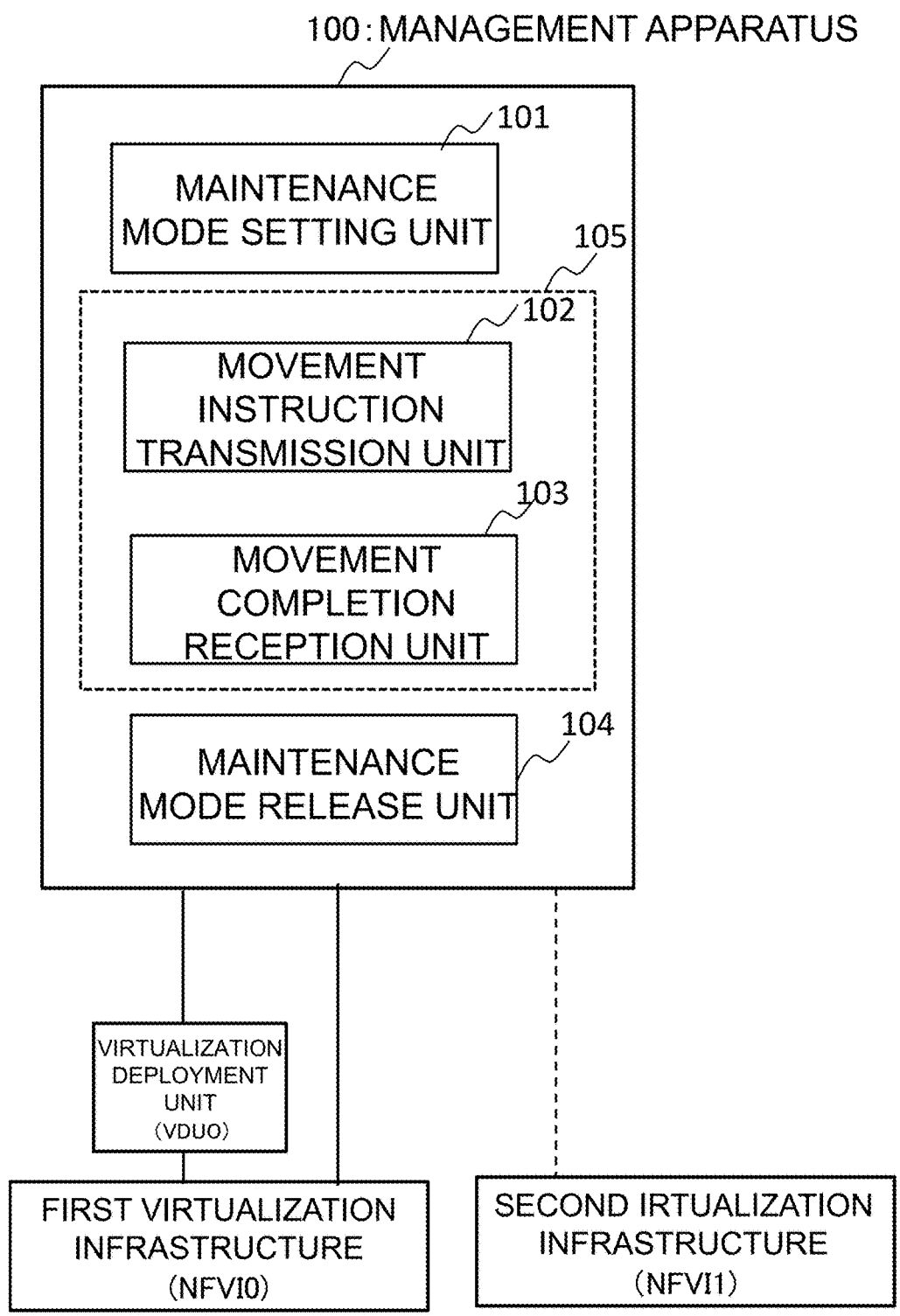
FIG. 19 illustrates Exemplary basic mode 1 of the present invention.

FIG. 19 illustrates exemplary basic mode 1 of the present invention. Referring to FIG. 19, a management apparatus 100 includes a maintenance mode setting unit 101 that transitions a first virtualization infrastructure (NFVI0) to a maintenance mode, a mobility control unit 105 that at least instructs a virtualization deployment unit (VDU) on the first virtualization infrastructure in the maintenance mode to move to a second virtualization infrastructure (NFVI1), and a maintenance mode release unit 104 that releases the maintenance mode of the first virtualization infrastructure (NFVI0). The mobility control unit 105 includes a movement instruction transmission unit 102 that transmits an instruction for moving the virtualization deployment unit (VDU) on the first virtualization infrastructure to the second virtualization infrastructure (NFVI1) and a movement completion reception unit (103) that receives a completion notification of the movement of the VDU to the second virtualization infrastructure (NFVI1). After the movement completion reception unit 103 receives a completion notification of the movement of the VDU to the second virtualization infrastructure (NFVI1), maintenance is performed on the first virtualization infrastructure (NFVI0), and the maintenance mode release unit 104 releases the maintenance mode of the first virtualization infrastructure (NFVI0). For example, the management apparatus 100 constitutes NFV-MANO or VIM in an NFV architecture (see FIG. 1). In FIG. 19, an individual function corresponding to a part or all of the processing of an individual unit may be realized by a computer program executed by a computer (a processor or a central processing unit (CPU)). In such a case, the management apparatus 100 includes a computer having a communication function and realizes a part or all of the processing of an individual unit by causing the computer to read and execute the program stored in a hard disk (hard disk drive) or a semiconductor storage device, which are not illustrated.

According to basic mode 1, time needed to move a virtual machine having a live migration function can be reduced.

According to basic mode 1, the management apparatus may constitute a virtualized infrastructure management apparatus (VIM), and a sending source that sends at least one of a request for transitioning the first virtualization infrastructure (NFVI0) to the maintenance mode and a request for releasing the maintenance mode of the first virtualization infrastructure (NFVI0) to the management apparatus 100 (VIM) may be a terminal, an orchestrator that performs management and integration of network functions virtualization (NFV), or a virtual network function (VNF) management apparatus that manages a virtual network function(s) (VNF).

Based on the request from the sending source, the management apparatus 100 (the virtualized infrastructure management apparatus: VIM) may perform at least one of the transition of the first virtualization infrastructure (NFVI0) to the maintenance mode and the release of the maintenance mode of the first virtualization infrastructure (NFVI0).

The terminal may be a maintenance terminal, an EMS (Element Management System), or an OSS (Operations Support Systems).

The management apparatus 100 (VIM) may receive the request for transitioning the first virtualization infrastructure (NFVI0) to the maintenance mode from the terminal, via at least one of the orchestrator (NFV Orchestrator) and the virtual network function management apparatus (VNFM).

The management apparatus 100 (VIM) may receive the request for releasing the maintenance mode of the first virtualization infrastructure (NFVI0) from the terminal via at least one of the orchestrator (NFV Orchestrator) and the virtual network function management apparatus (VNFM).

The management apparatus 100 (VIM) may transmit a fault notification transmitted by the first virtualization infrastructure (NFVI0) to the orchestrator (NFV Orchestrator) directly or via the virtual network function management apparatus (VNFM). In addition, the management apparatus 100 (VIM) may receive the request for transitioning the first virtualization infrastructure (NFVI0) to the maintenance mode, a sending source of the request being the orchestrator (NFV Orchestrator).

The management apparatus 100 (VIM) may receive the request for transitioning the first virtualization infrastructure (NFVI0) to the maintenance mode, a sending source of the request being the virtual network function management apparatus (VNFM).

A system configuration according to basic mode 1 may include: a virtualized infrastructure management apparatus (VIM) that controls an infrastructure(s) (NFVI) on which a virtual machine(s) is executed; first and second virtualization infrastructures (NFVI0/1); and a terminal or an upper apparatus of the virtualized infrastructure management unit (VIM). The virtualized infrastructure management apparatus (VIM) may receive a request for transitioning the first virtualization infrastructure to a maintenance mode from the terminal or the upper apparatus, transition the first virtualization infrastructure (NFVI0) to the maintenance mode, and instruct movement of a virtualization deployment unit (VDU) on the first virtualization infrastructure to the second virtualization infrastructure (NFVI1). In addition, after the VDU moves to the second virtualization infrastructure, the virtualized infrastructure management apparatus (VIM) receives the request for releasing the maintenance mode of the first virtualization infrastructure from the terminal or the upper apparatus, and maintenance on the first virtualization infrastructure is finished, the virtualized infrastructure manager may release the maintenance mode of the first virtualization infrastructure.

<Exemplary Basic Mode 2>

Figure 20:
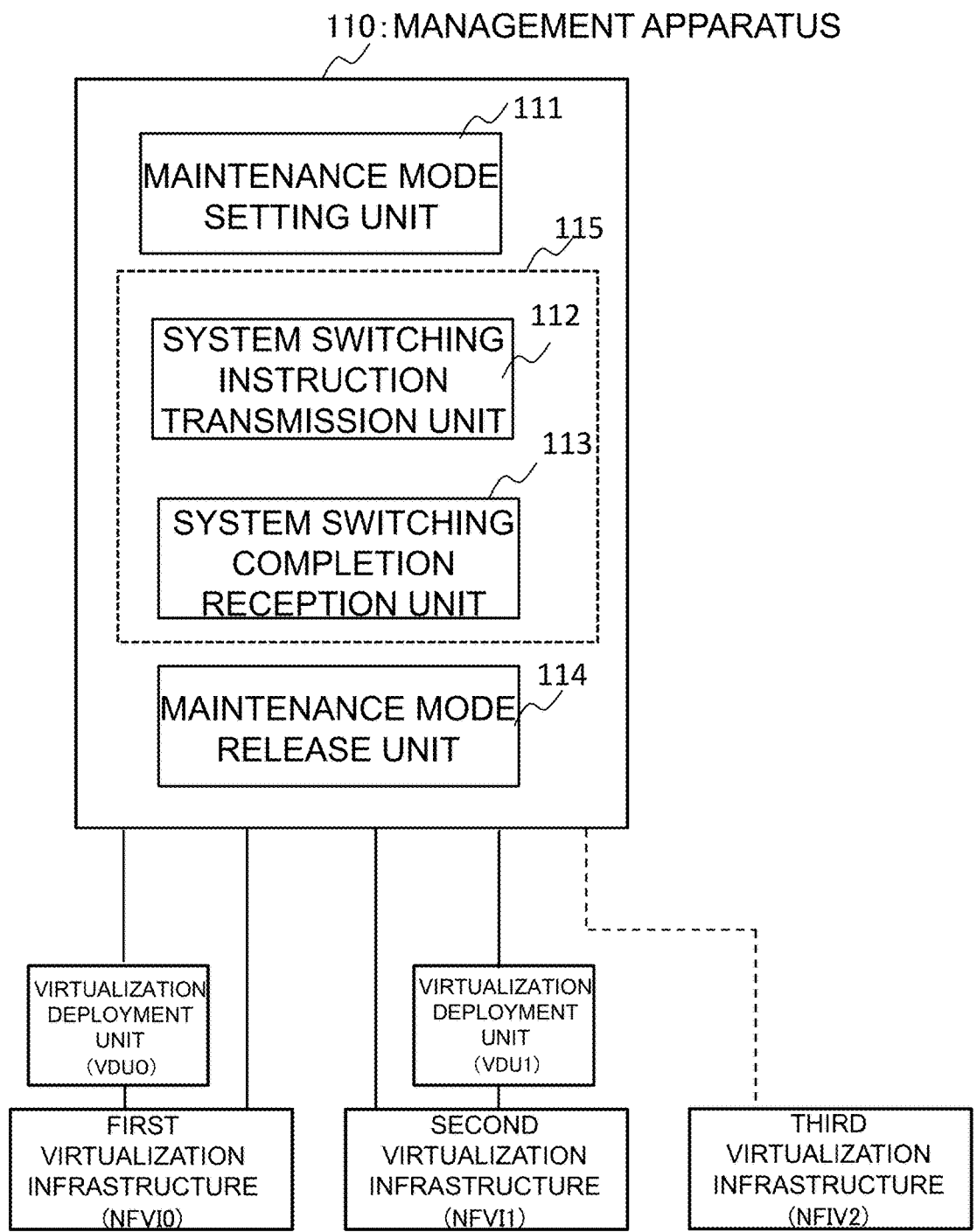
FIG. 20 illustrates Exemplary basic mode 2 of the present invention.

FIG. 20 illustrates exemplary basic mode 2 of the present invention. Referring to FIG. 20, a management apparatus 110 includes: a maintenance mode setting unit 111 that transitions a first virtualization infrastructure (NFVI0) to a maintenance mode; a system switching control unit 115 that at least instructs system switching between a first virtualization deployment unit (VDU0) (an active system) on the first virtualization infrastructure and a second virtualization deployment unit (VDU1) (a standby system) on a second virtualization infrastructure (NFVI1); and a maintenance mode release unit 114 that releases the maintenance mode of the first virtualization infrastructure (NFVI0) after the first virtualization deployment unit (VDU0) moves to a third virtualization infrastructure (NFVI2) and is switched to serve as a standby system.

The system switching control unit 115 may include: a system switching instruction transmission unit 112 that transmits an instruction for system switching to the first virtualization deployment unit (VDU0) (an active system) on the first virtualization infrastructure; and a system switching completion reception unit 113 that receives a completion notification of the switching of the first virtualization deployment unit (VDU0) to a standby system and the switching of the second virtualization deployment unit (VDU1) to an active system from the second virtualization deployment unit (VDU1) that becomes an active system.

Figure 1:
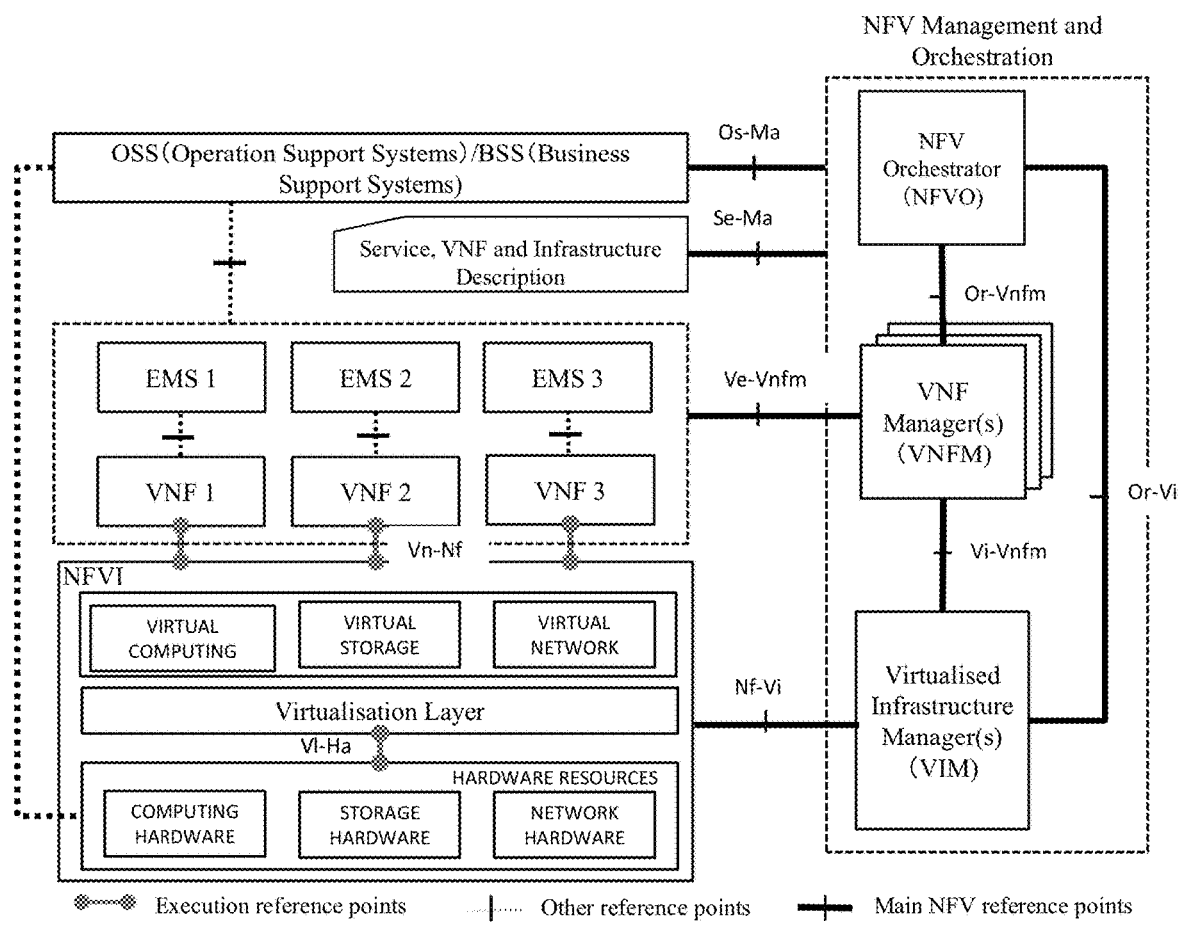
FIG. 1 illustrates NFV-MANO in an NFV architecture (cited from FIG. 4 in NPL 1).
Figure 2:
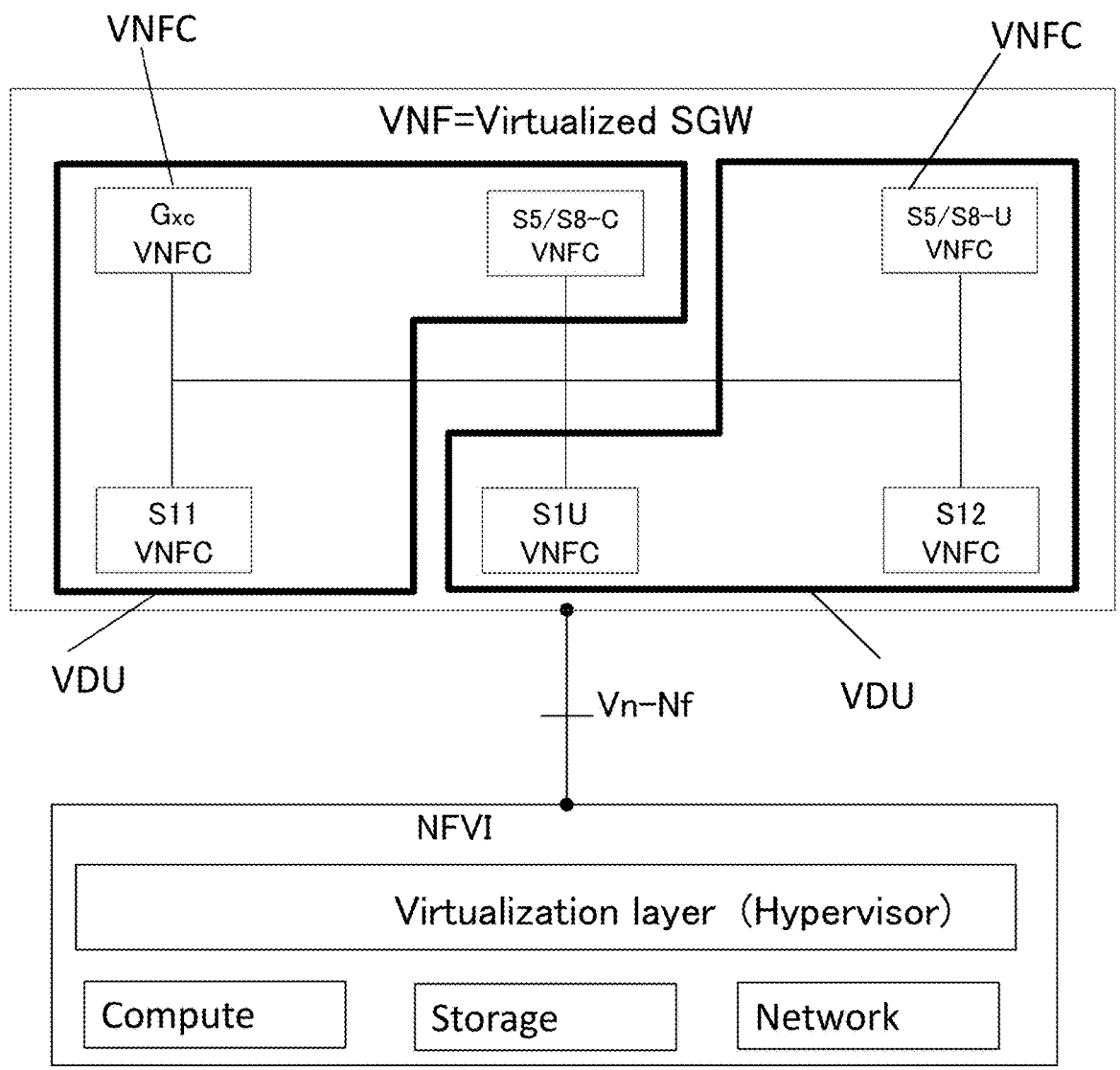
FIG. 2 illustrates a relationship among an individual VNF, VNFC, and VDU.

For example, the management apparatus 110 may constitute NFV-MANO in FIG. 1. In FIG. 20, an individual function corresponding to a part or all of the processing of an individual unit may be realized by a program executed by a computer.

Basic mode 2 can realize system switching without service interruption, for example, even when a virtual machine that does not have a live migration function is used.

Basic mode 2 may include a virtualized infrastructure management apparatus (VIM) which controls the virtualization infrastructure(s) (NFVI) and which includes the maintenance mode setting unit and the maintenance mode release unit.

A sending source that sends at least one of a request for transitioning the first virtualization infrastructure (NFVI0) to the maintenance mode and a request for releasing the maintenance mode of the first virtualization infrastructure (NFVI0) to the virtualized infrastructure management apparatus (VIM) may be a terminal or an upper apparatus of the virtualized infrastructure management apparatus (VIM).

Based on the request from the terminal or the upper apparatus, the virtualized infrastructure management apparatus (VIM) 110 may perform at least one of the transition of the first virtualization infrastructure (NFVI0) to the maintenance mode by using the maintenance mode setting unit and the release of the maintenance mode of the first virtualization infrastructure (NFVI0) by using the maintenance mode release unit.

The upper apparatus may be an orchestrator (NFV Orchestrator) that performs management and integration of network functions virtualization (NFV) or a virtual network function management apparatus (VNFM) that manages a virtual network function(s) (VNF).

The virtualized infrastructure management apparatus (VIM) 110 may receive the request for transitioning the first virtualization infrastructure (NFVI0) to the maintenance mode from the terminal via the orchestrator (NFV Orchestrator) or the virtual network function management apparatus (VNFM).

The virtualized infrastructure management apparatus (VIM) 110 may receive the request for releasing the maintenance mode of the first virtualization infrastructure (NFVI0) from the terminal via the orchestrator (NFV Orchestrator) or the virtual network function management apparatus (VNFM).

The virtualized infrastructure management apparatus (VIM) 110, on reception of a fault notification transmitted by the first virtualization infrastructure, may send the fault notification to the orchestrator (NFV Orchestrator) directly or via the virtual network function management apparatus (VNFM). In addition, the virtualized infrastructure management apparatus (VIM) 110 may receive the request for transitioning the first virtualization infrastructure (NFVI0) to the maintenance mode, a sending source of the request being the orchestrator (NFV Orchestrator).

The virtualized infrastructure management apparatus (VIM) 110, on reception of a fault notification transmitted by the first virtualization infrastructure, may send the fault notification to the virtual network function management apparatus (VNFM). In addition, the virtualized infrastructure management apparatus (VIM) 110 may receive the request for transitioning the first virtualization infrastructure (NFVI0) to the maintenance mode, a sending source of the request being the virtual network function management apparatus (VNFM).

The virtual network function management apparatus (VNFM) may include the system switching instruction transmission unit and the system switching completion reception unit. In addition, on reception of a notification from the virtualized infrastructure management apparatus that the first virtualization infrastructure (NFVI0) has transitioned to the maintenance mode, the virtual network function management apparatus (VNFM) may transmit the system switching instruction.

On reception of a notification from the virtualized infrastructure management apparatus (VIM) that the first virtualization infrastructure (NFVI0) has transitioned to the maintenance mode, the terminal may transmit the system switching instruction as the system switching instruction transmission unit. In addition, the terminal may receive the system switching completion notification as the system switching completion reception unit.

A system configuration according to basic mode 2 may include: a virtualized infrastructure management apparatus (VIM) that controls an execution infrastructure(s) (NFVI) on which a virtual machine(s) is executed; first, second, third virtualization infrastructures (NFVI); an upper apparatus of the virtualized infrastructure management unit (VIM); and a terminal. First and second virtualization deployment units (VDU) on the first and second virtualization infrastructures may form a redundancy configuration of active and standby systems, respectively.

On reception of a request for transitioning the first virtualization infrastructure to a maintenance mode from the terminal or the upper apparatus, the virtualized infrastructure management apparatus (VIM) may transition the first virtualization infrastructure to the maintenance mode and notify the upper apparatus or the terminal of the transition.

The upper apparatus or the terminal may instruct system switching between the first virtualization deployment unit (VDU) on the first virtualization infrastructure and the second virtualization deployment unit (VDU) on the second virtualization infrastructure.

The virtualized infrastructure management apparatus (VIM) may receive a system switching completion notification indicating that the first virtualization deployment unit (VDU0) has switched to a standby system and that the second virtualization deployment unit (VDU1) has switched to an active system. After the first virtualization deployment unit (VDU) moves to the third virtualization infrastructure and maintenance on the first virtualization infrastructure is performed, the virtualized infrastructure management apparatus (VIM) may release the maintenance mode of the first virtualization infrastructure.

Hereinafter, related techniques to which the above example basic mode 1 or 2 is not applied will be described as Reference examples.

REFERENCE EXAMPLE 1

Figure 3:
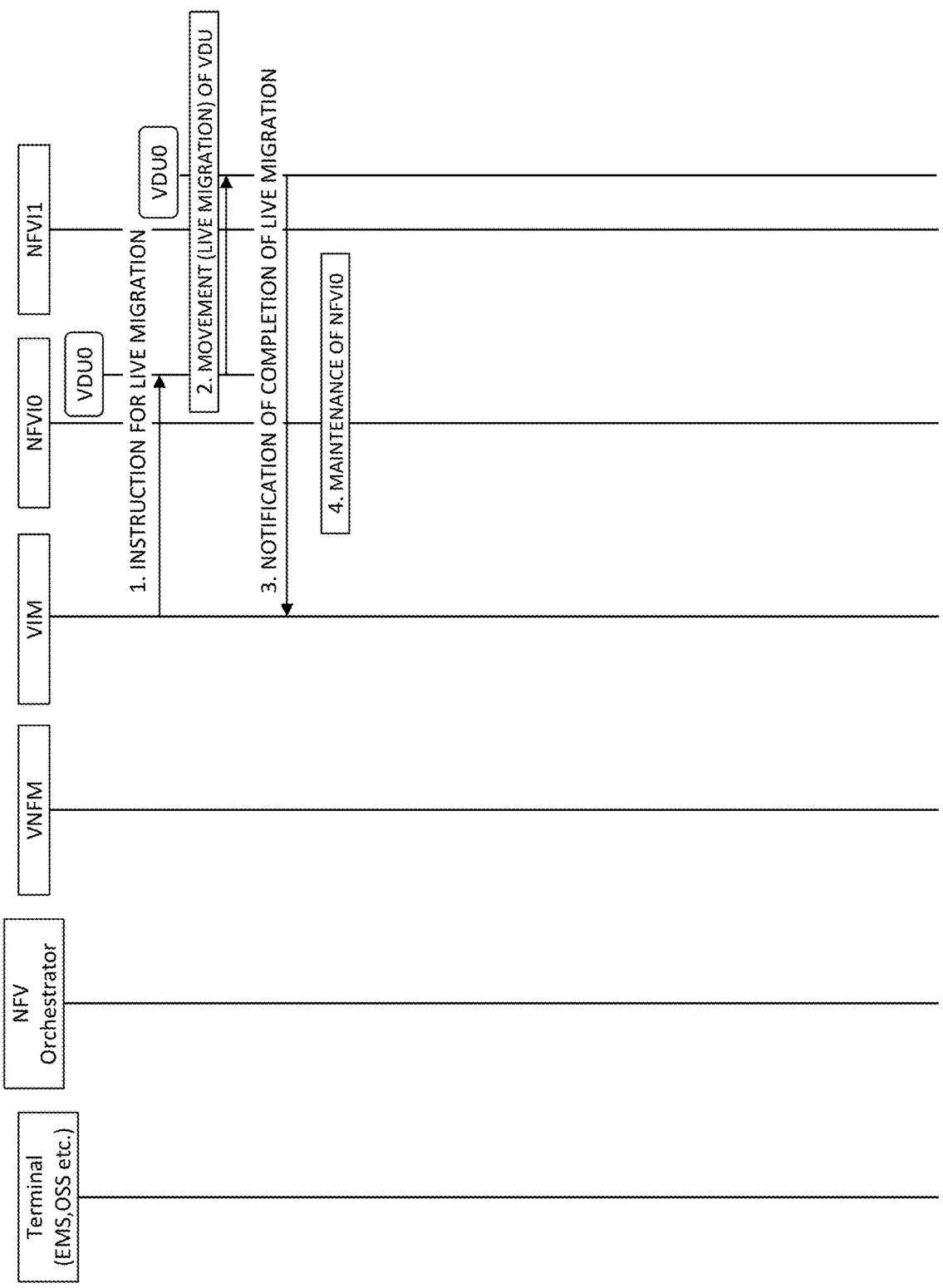
FIG. 3 illustrates Reference Example 1.

FIG. 3 illustrates a sequence according to a first example (Reference example 1) assumed. In FIG. 3, a terminal (EMS, OSS, etc.), an orchestrator, VNFM, VIM, NFVI0, and NFVI1 correspond to a terminal 40, an orchestrator 11, VNFM 12, VIM 13, NFVI031, and NFVI132 in FIG. 5, respectively. The sequence in FIG. 3 includes sequence numbers for ease of description.

According to Reference example 1 in FIG. 3, VIM instructs movement (live migration) of VDU0 from NFVI0 to NFVI1(1).

VDU0 moves to NFVI1(2). Next, VDU0 sends a completion notification of the movement (a completion notification of live migration) to VIM (3). Next, maintenance on NFVI0 is performed (4).

A technique illustrated in FIG. 3 cannot be applied to VDU that does not support live migration, which is a technique of moving an active virtual machine (VM) to another physical machine (a server) or the like without substantially completely stopping the VM. Namely, unless VDU supports live migration, a rolling update through live migration in FIG. 3 is impossible.

In addition, the cooperation between an individual VIM and NFVI in live migration is not clearly defined in the above NFV specifications.

In addition, movement (live migration) of VM from the maintenance target NFVI0 to NFVI1 takes time. In particular, such a VM that has a memory content thereof frequently changed takes time for live migration.

In addition, according to the method in FIG. 3, a newly generated VM could be allocated to the maintenance target NFVI0 during when the VDU is moving from the maintenance target NFVI0 to NFVI1. This is because, when a VM is allocated, there is a possibility that the maintenance target NFVI (NFVI0 in FIG. 3) having available resources could be selected as a VM allocation target.

REFERENCE EXAMPLE 2

Figure 4:
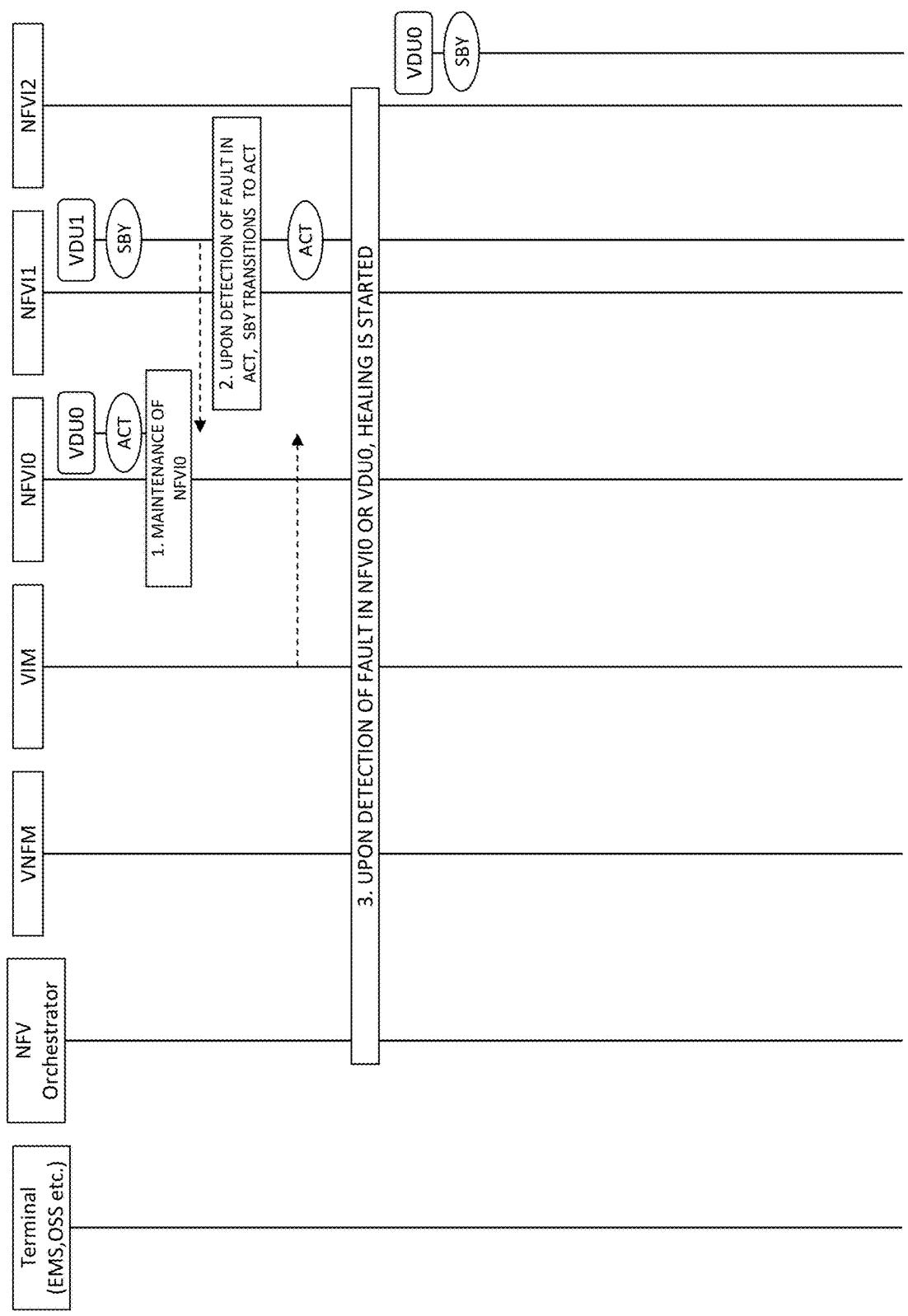
FIG. 4 illustrates Reference Example 2.

Next, a second example (Reference example 2) tentatively assumed other than the present invention will be described. FIG. 4 illustrates a sequence according to Reference example 2 (which is not disclosed in the above NPL 1). In FIG. 4, a terminal (EMS, OSS, etc.), an orchestrator, VNFM, VIM, NFVI0, NFVI1, and NFVI2 correspond to a terminal 40, an orchestrator 11, VNFM 12, VIM 13, NFVI0 31, NFVI1 32, and NFVI2 33 in FIG. 6, respectively.

In FIG. 4, VDU0 with NFVI0 as execution infrastructure thereof is an active system (Act) and VDU1 with NFVI1 as an execution infrastructure thereof is a standby system (SBY) configure a duplication system. If a fault is detected in the active system (Act), system switching is performed in which the original active and standby systems are switched to standby and active systems, respectively.

As a result of the system switching, VDU1 with NFVI1 as execution infrastructure thereof becomes an active system. Next, for example, upon detection of the fault in NFVI0 or VDU0, healing is started. As this healing, auto healing function (auto fault reconfiguration) may be performed wherein, when a fault is detected, a virtual machine (VM) is automatically restarted on other hardware. As a result of the healing, the VDU0 is moved from the NFVI0 to the NFVI2 and is used as a standby system (SBY).

However, Reference example 2 in FIG. 4 has the following problems.

Service interruption is caused by a set of VDU0/VDU1 in a time interval from occurrence of a fault in VDU0 until switching of VDU1 to an active system (ACT).

In addition, until VDU0 is healed, moved to NFVI2, and switched to a standby system (SBY), a single operation is performed by only VDU1 (redundancy by duplication or the like cannot be maintained).

Furthermore, cooperation between VIM and NFVI as those in the sequence in FIG. 4 is not clearly defined in the above NFV specifications and so forth.

Exemplary Embodiment 1

Figure 5:
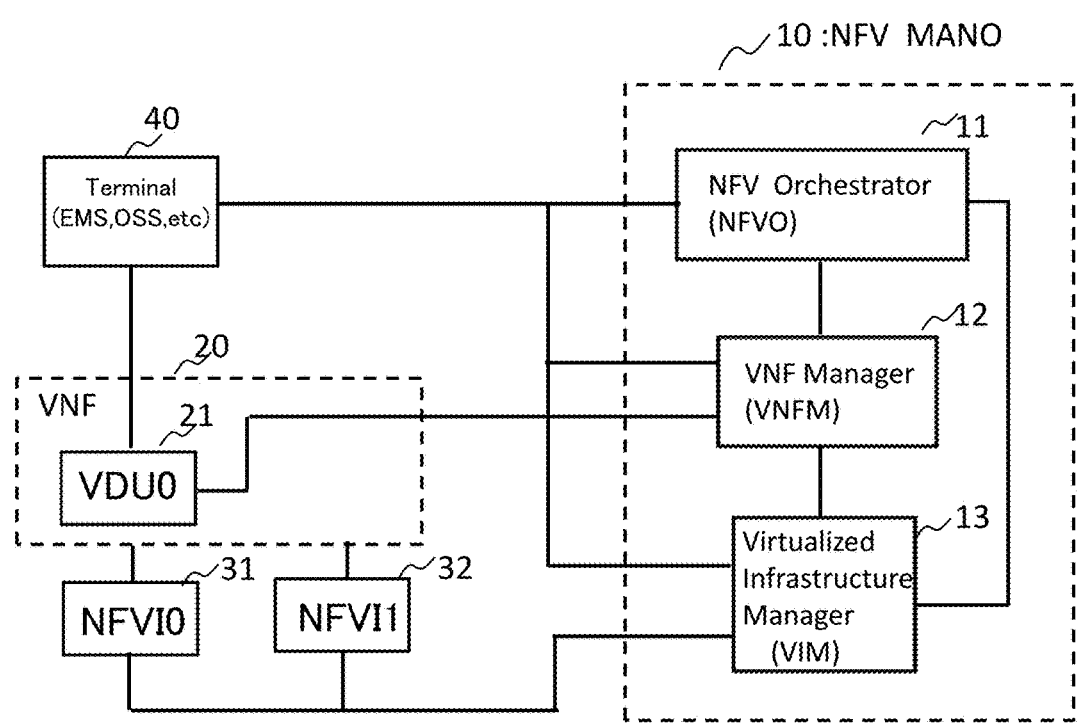
FIG. 5 illustrates an example of a system configuration according to Exemplary Embodiment 1.

FIG. 5 illustrates a system configuration according to Exemplary embodiment 1. A terminal 40 may be an EMS (element management system), an OSS, a maintenance terminal, or the like. Thus, the terminal 40 is represented as "Terminal (EMS, OSS, etc.) 40" in FIG. 5. The terminal 40 will be represented in the same way in the subsequent drawings. Reference numeral 10 deSupplementary Notes NFV MANO 10 (see FIG. 1), 11 deSupplementary Notes NFV orchestrator (NFVO), 12 deSupplementary Notes VNF manager (VNFM), 13 deSupplementary Notes a virtualized infrastructure management unit (VIM), 20 deSupplementary Notes VNF, and 21 deSupplementary Notes VDU0. Execution infrastructure (Infrastructure) of VDU0 is NFVI0 31.

Exemplary embodiment 1 in FIG. 5 corresponds to the above example basic mode 1, and VDU0 21 has a live migration function.

In FIG. 5, for example, a line connecting elements is only a schematic representation. For example, NFVO 11, VNFM 12, and VIM 13 are connected to the terminal (EMS, OSS, etc.) 40 and individually send and receive a signal (information) (NFVO 11, VNFM 12, and VIM 13 are not connected in common to a common signal line at a single point).

In addition, while each of NFVI0 and NFVI1 is connected to VIM 13, NFVI0 and NFVI1 are not connected in common to a single point or connected to each other. The same holds true for the corresponding representation in FIG. 6.

Basic Operation According to Exemplary Embodiment 1

Figure 7:
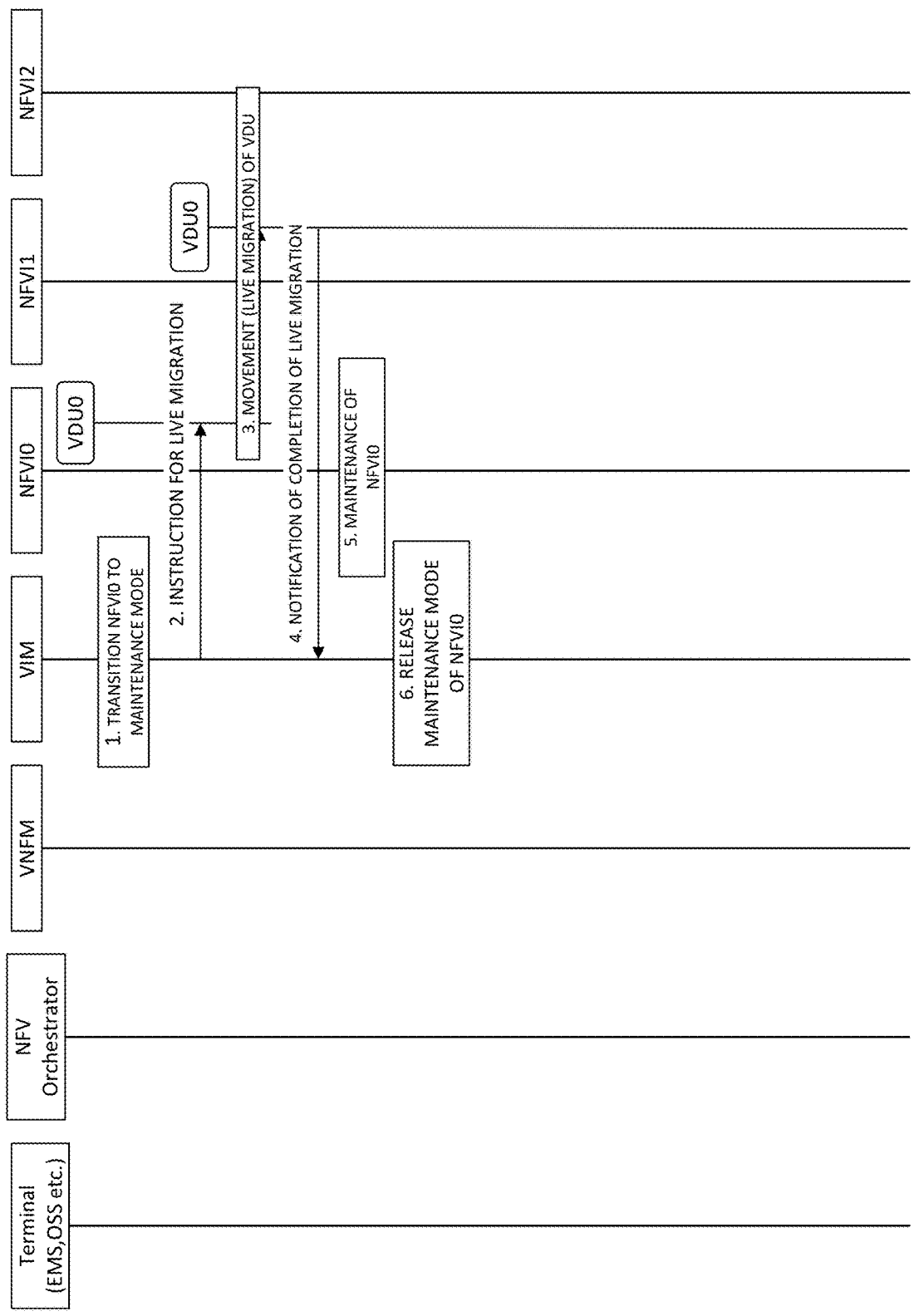
FIG. 7 is a control sequence according to Exemplary Embodiment 1.

FIG. 7 illustrates a basic operation sequence according to Exemplary embodiment 1 illustrated in FIG. 5. In FIG. 7 and the subsequent sequences, the elements in FIG. 5 will be referred to by their names, and the reference numerals of the elements will be omitted. In addition, the sequences include sequence numbers.

Referring to FIG. 7, VIM transitions (switches) NFVI0 needing maintenance from a normal mode to a maintenance mode (1).

VIM may acquire information about NFVI needing maintenance from the upper NFV Orchestrator (NFVO) (which will be referred to as an "orchestrator"), the terminal, or the like. In this step, VIM may set "ON" in flag information indicating a maintenance mode, as information about a state of a maintenance target NFVI. VIM removes NFVI that is in the maintenance mode from selection targets (removes from selection candidate(s) to which a VM(s) could be allocated). Namely, VIM does not perform various kinds of setting control processing or the like (setting or control processing in a normal mode) to NFVI. When NFVI is in a maintenance mode, VIM does not perform setting or control operations on the NFVI (in a disabled state), such as allocation of VM(s), which VIM performs on a normal mode NFVI.

VIM instructs VDU0 on NFVI needing maintenance (in this case, NFVI0 set in the maintenance mode) to perform live migration to NFVI1 (2).

VDU0 performs movement (live migration) from NFVI0 to the NFVI1 (3).

After moving to the NFVI1, VDU0 sends a live migration completion notification to VIM (4).

Next, maintenance on NFVI0 is performed. This maintenance may be automatic maintenance performed by using, for example, a fault management maintenance tool for NFVI. Alternatively, the maintenance may be performed manually.

Upon completion of the maintenance on NFVI0, VIM releases the maintenance mode of NFVI0. For example, VIM may set "OFF" in flag information indicating a maintenance mode. NFVI0 restores from the maintenance mode to a normal mode, and VIM is able to perform various kinds of setting control processing on NFVI0 (in an enabled state).

According to Exemplary embodiment 1, by removing NFVI0 in a maintenance mode from NFVI selection targets, for example, a new VM is not allocated to NFVI0, during when VDU0 is moving from NFVI0 to NFVI2. Thus, NFVI0 in a maintenance mode does not affect any of the VDUs other than VDU0.

Exemplary Embodiment 1-1

Figure 8:
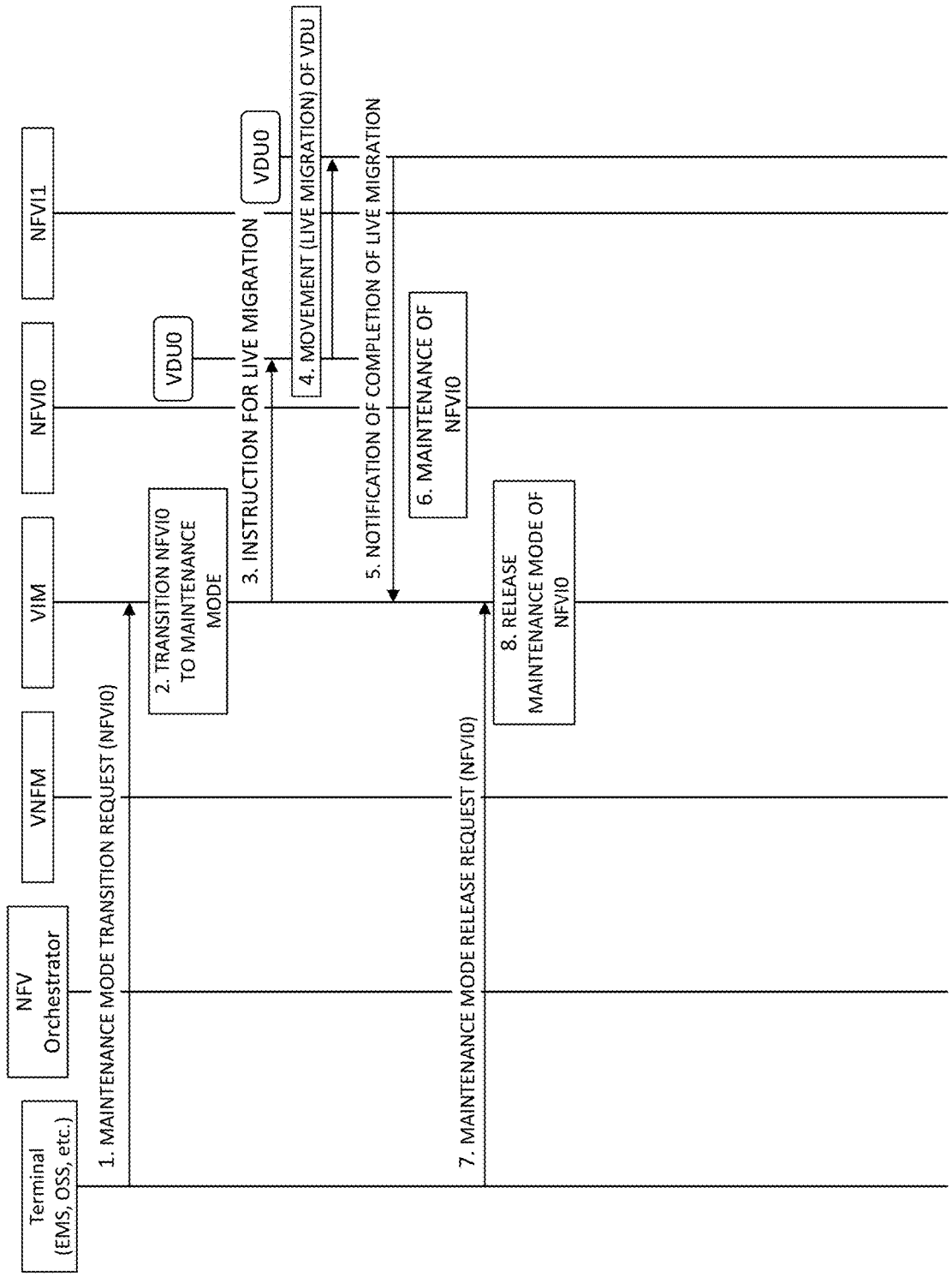
FIG. 8 is a control sequence according to Exemplary Embodiment 1-1.

FIG. 8 illustrates an operation sequence according to Exemplary embodiment 1-1. The basic system configuration according to Exemplary embodiment 1-1 is the same as that illustrated in FIG. 5. According to Exemplary embodiment 1-1, with operation(s) or the like of a maintenance engineer on a terminal (Terminal)s, an instruction is issued to VIM which transitions (switches) the NFVI0 to the maintenance mode The terminal may be a maintenance management system (terminal) such as EMS, OSS, or a node such as an external monitoring apparatus.

Referring to FIG. 8, an operation or the like from the terminal (Terminal) transmits a request for transitioning NFVI0to a maintenance mode to VIM via Orchestrator (1). In response to this request, VIM transitions a state of NFVI0(managed by VIM) to the maintenance mode (2). In addition, the terminal transmits a request for releasing the maintenance mode of NFVI0to VIM (7). In response to this request, VIM releases the maintenance mode of a state of NFVI0(managed by VIM) (8). Since the other processing in the sequence is the same as that in FIG. 7, description thereof will be omitted.

According to Exemplary embodiment 1-1, NFVI0in a maintenance mode is removed from NFVI selection targets of various kind of processing to be performed, as a result of which it is made possible for NFVI0in the maintenance to avoid influencing on any of the VDUs other than VDU0.

In addition, the setting of NFVI0to the maintenance mode is not performed by automatic processing of VIM. For example, NFVI is transitioned to a maintenance mode in response to a request from outside (terminal or a node such as a monitoring apparatus not illustrated) (In this regard, the NVF specifications have no definition).

Exemplary Embodiment 1-2

Figure 9:
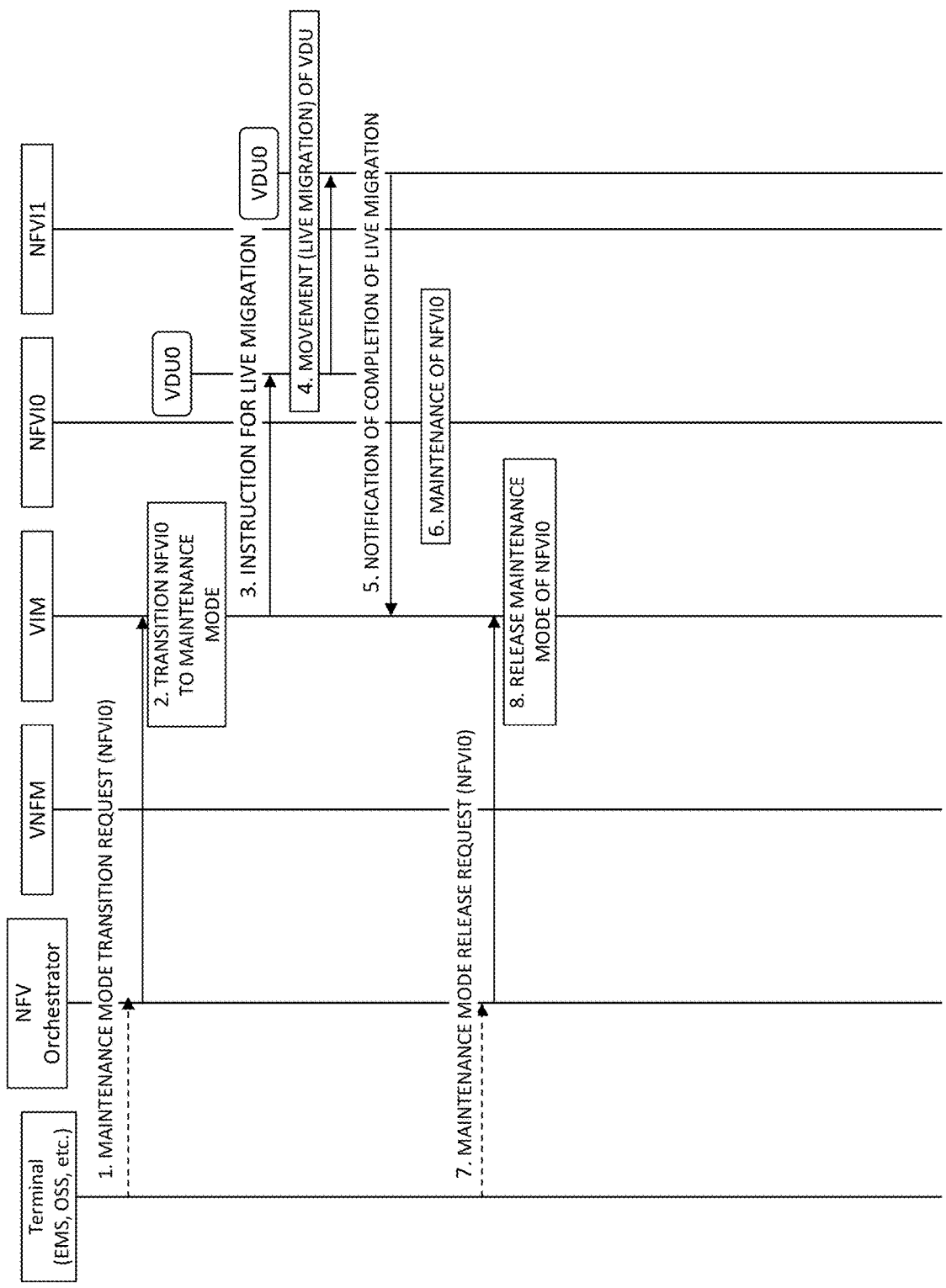
FIG. 9 is a control sequence according to Exemplary Embodiment 1-2.

FIG. 9 illustrates an operation sequence according to Exemplary embodiment 1-2. A basic system configuration according to Exemplary embodiment 1-2 is the same as that illustrated in FIG. 5. Exemplary embodiment 1-2 differs from Exemplary embodiment 1-1 in that with operation(s) or the like of a maintenance engineer on a terminal (Terminal) (or an external node), an instruction is issued via Orchestrator to VIM which transitions the NFVI0to the maintenance mode according to Exemplary embodiment 1-2, too.

Referring to FIG. 9, by an operation or the like on a terminal (Terminal) (or an external node), a request for transitioning NFVI0to a maintenance mode is sent via Orchestrator to VIM (1). In response to this request, VIM transitions (switches) a state of NFVI0(managed by VIM) to a maintenance mode (2). By an operation or the like on a terminal (Terminal) (or an external node), a request for releasing the maintenance mode of NFVI0is sent via Orchestrator (7) to VIM. In response to this request, VIM releases the maintenance mode of a state of NFVI0 (managed by the VIM) (8). Since the other processing in the sequence is the same as that in FIG. 7, description thereof will be omitted.

According to Exemplary embodiment 1-2, NFVI0in the maintenance mode is removed from NFVI selection targets for various kind of processing, as a result of which, it is made possible for NFVI0in the maintenance to avoid influencing on any of the VDUs other than VDU0.

In addition, according to the Exemplary embodiment 1-2, VIM control is performed via Orchestrator, thereby unifying requests to MANO from Outside on Orchestrator.

Further, according to Exemplary embodiment 1-2, instead of an instruction from a terminal (Terminal), Orchestrator can become a starting point to issue an instruction to VIM, using reservation processing or the like.

Exemplary Embodiment 1-3

Figure 10:
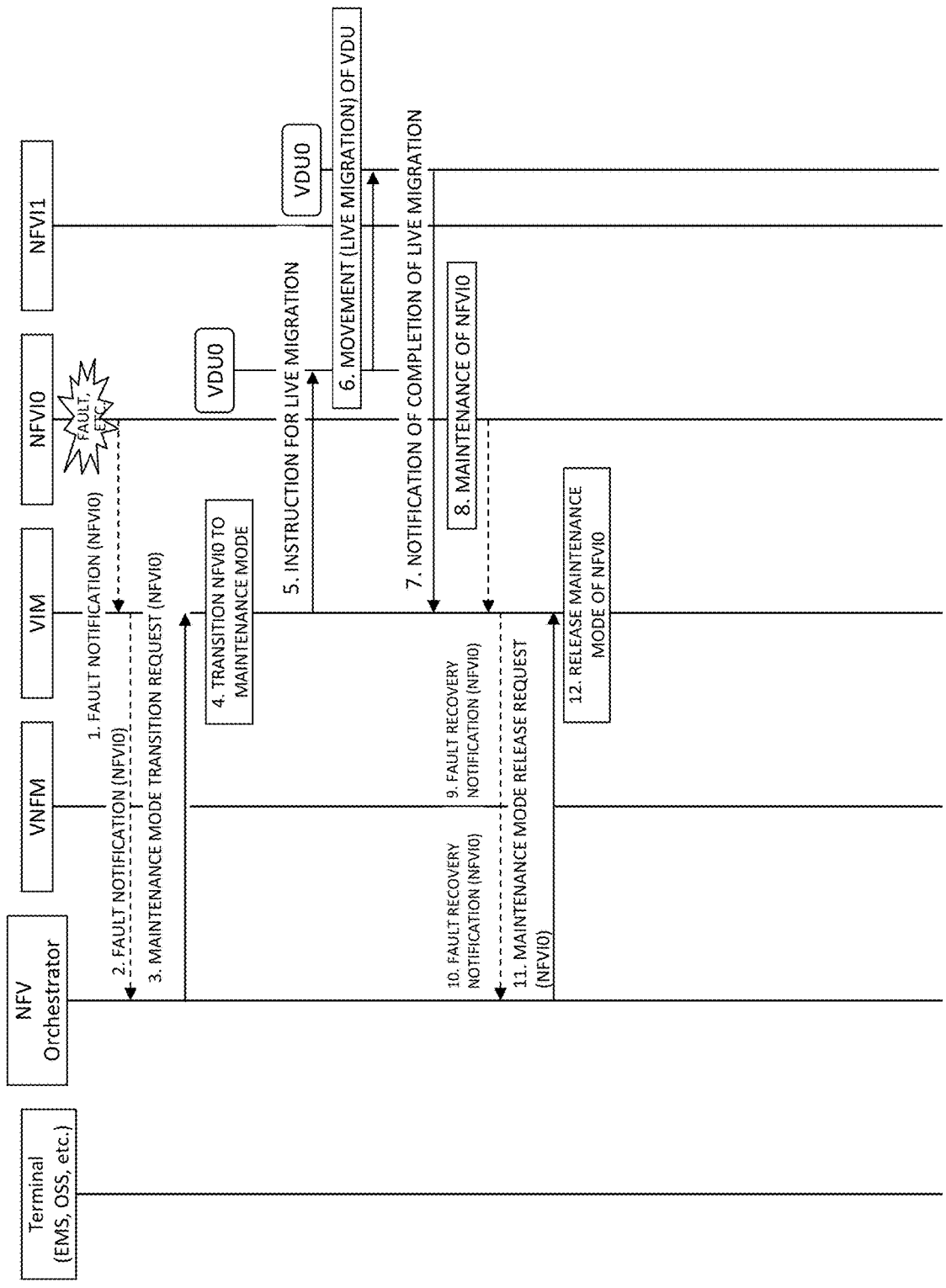
FIG. 10 is a control sequence according to Exemplary Embodiment 1-3.

FIG. 10 illustrates an operation sequence according to Exemplary embodiment 1-3. A basic system configuration according to Exemplary embodiment 1-3 is the same as that illustrated in FIG. 5. According to Exemplary embodiment 1-3, a cause of maintenance of NFVI0is assumed to be occurrence of a fault in NFVI0. A fault notification from NFVI0is directly notified from VIM to Orchestrator, and a maintenance mode transition request is directly transmitted from Orchestrator to VIM.

More specifically, referring to FIG. 10, when a fault occurs in NFVI0, a fault notification (NFVI0) from NFVI0is sent to VIM (1).

VIM sends the fault notification (NFVI0) to Orchestrator (2).

Orchestrator transmits a request for transitioning NFVI0to a maintenance mode to VIM (3). Subsequent processing until maintenance of NFVI0(8) is the same as that according to Exemplary embodiment 1 in the FIG. 7.

After the maintenance of NFVI0(8), NFVI0transmits a fault recovery notification to VIM (9).

VIM transmits the fault recovery notification to Orchestrator (10).

Orchestrator transmits a request for releasing the maintenance mode of NFVI0to VIM (11).

In response to this request, VIM releases the maintenance mode of a state of NFVI0 (managed by the VIM) (12). The other processing in the sequence is the same as that in FIG. 7, description thereof will be omitted.

According to Exemplary embodiment 1-3, NFVI0in a maintenance mode is removed from NFVI selection targets for various kind of processing to be performed. Thus, it is made possible for NFVI0in the maintenance to avoid influencing on any of the VDUs other than VDU0.

In addition, it is also possible to perform VIM control, with Orchestrator as a starting point, without going through Terminal, triggered by an occurrence of a fault in NFVI0.

The fault notification of NFVI0may be transmitted to Terminal, and Terminal may transmit to VIM a request for transitioning NFVI0to the maintenance mode.

Exemplary Embodiment 1-4

Figure 11:
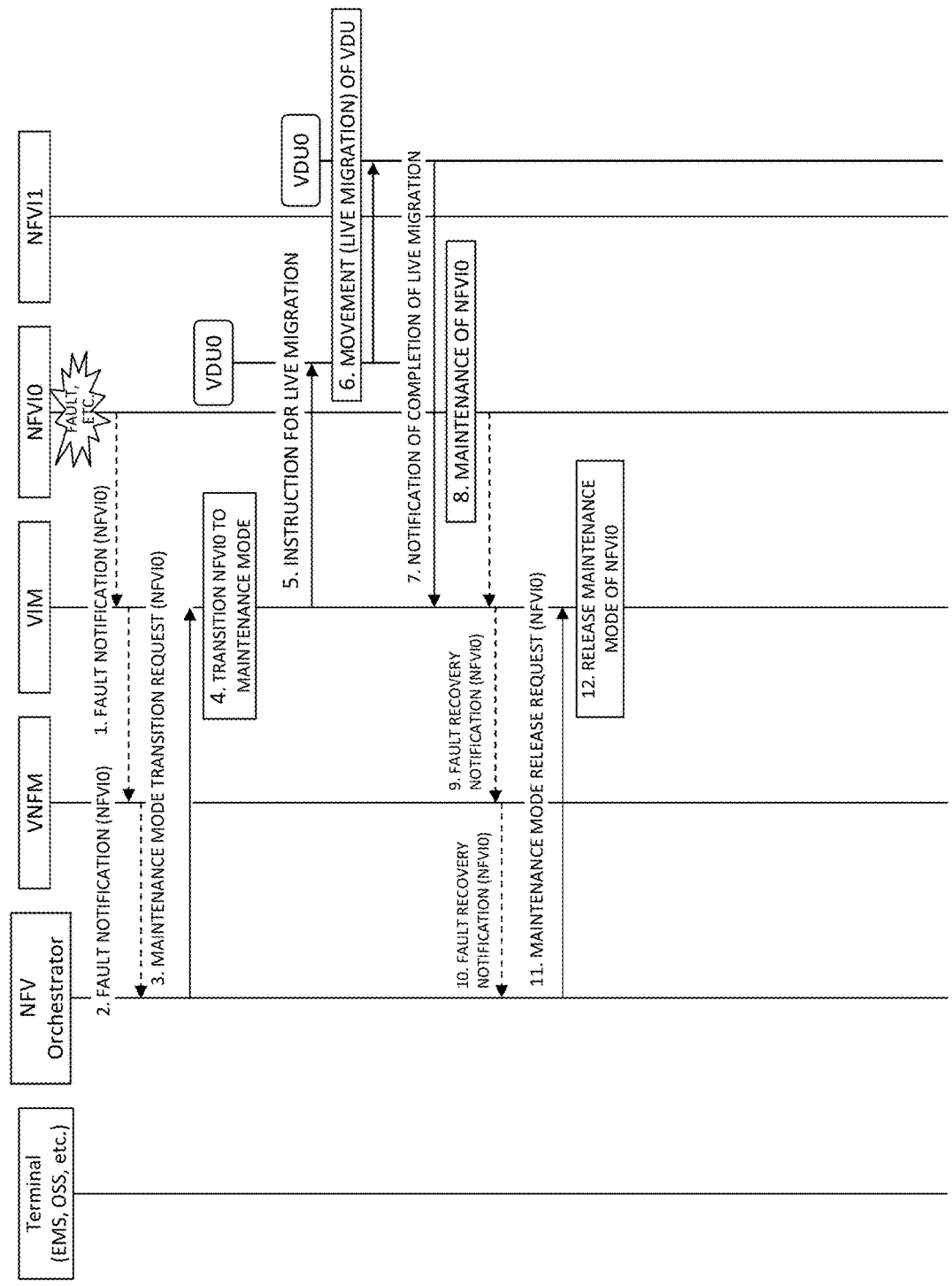
FIG. 11 is a control sequence according to Exemplary Embodiment 1-4.

FIG. 11 illustrates an operation sequence according to Exemplary embodiment 1-4. A basic system configuration according to Exemplary embodiment 1-4 is the same as that illustrated in FIG. 5. According to the Exemplary embodiment 1-4, as in Exemplary embodiment 1-3, a cause of maintenance of NFVI0is assumed to be occurrence of a fault in NFVI0. However, according to Exemplary embodiment 1-4, a fault notification of NFVI0is sent via VNFM to Orchestrator. A request for transitioning NFVI0to the maintenance mode from Orchestrator is sent to VIM. In addition, a fault recovery notification from VIM to Orchestrator is sent via VNFM, and a maintenance mode release request from Orchestrator is sent to VIM.

More specifically, referring to FIG. 11, when a fault occurs in NFVI0, a fault notification (NFVI0) from NFVI0is sent to VIM (1).

VIM sends the fault notification (NFVI0) to Orchestrator via VNFM (2).

Orchestrator sends a request for transitioning NFVI0to the maintenance mode to VIM (not via VNFM) (3). The subsequent processing until the maintenance of the NFVI0(8) is the same as that according to Exemplary embodiment 1 in the FIG. 7.

After the maintenance of the NFVI0(8), a fault recovery notification from NFVI0is sent to VIM (9).

VIM transmits the fault recovery notification to Orchestrator via VNFM (10).

Orchestrator sends a request for releasing the maintenance mode of NFVI0to VIM (not via the VNFM) (11).

In response to this request, VIM releases the maintenance mode of a state of NFVI0(managed by VIM) (12). The other processing in the sequence is the same as that in FIG. 7, description thereof will be omitted.

According to Exemplary embodiment 1-4, NFVI0in the maintenance mode is removed from NFVI selection targets for various kind of processing to be performed. Thus, it is possible for NFVI0in the maintenance mode to avoid influencing on any of VDUs other than VDU0.

In addition, according to Exemplary embodiment 1-4, it is also possible to perform VIM control, with Orchestrator as a starting point, without going through Terminal, triggered by an occurrence of a fault in NFVI0.

According to Exemplary embodiment 1-4, a fault of NFVI0may be notified to Terminal, and for example, by an operation of a maintenance engineer (or an external node), a request for transitioning NFVI0to the maintenance mode may be sent to VIM.

According to Exemplary embodiment 1-4, NFVI0in the maintenance mode is removed from selection targets. Thus, it is possible for NFVI0in the maintenance mode to avoid influencing on any of VDUs other than VDU0.

Exemplary Embodiment 1-5

Figure 12:
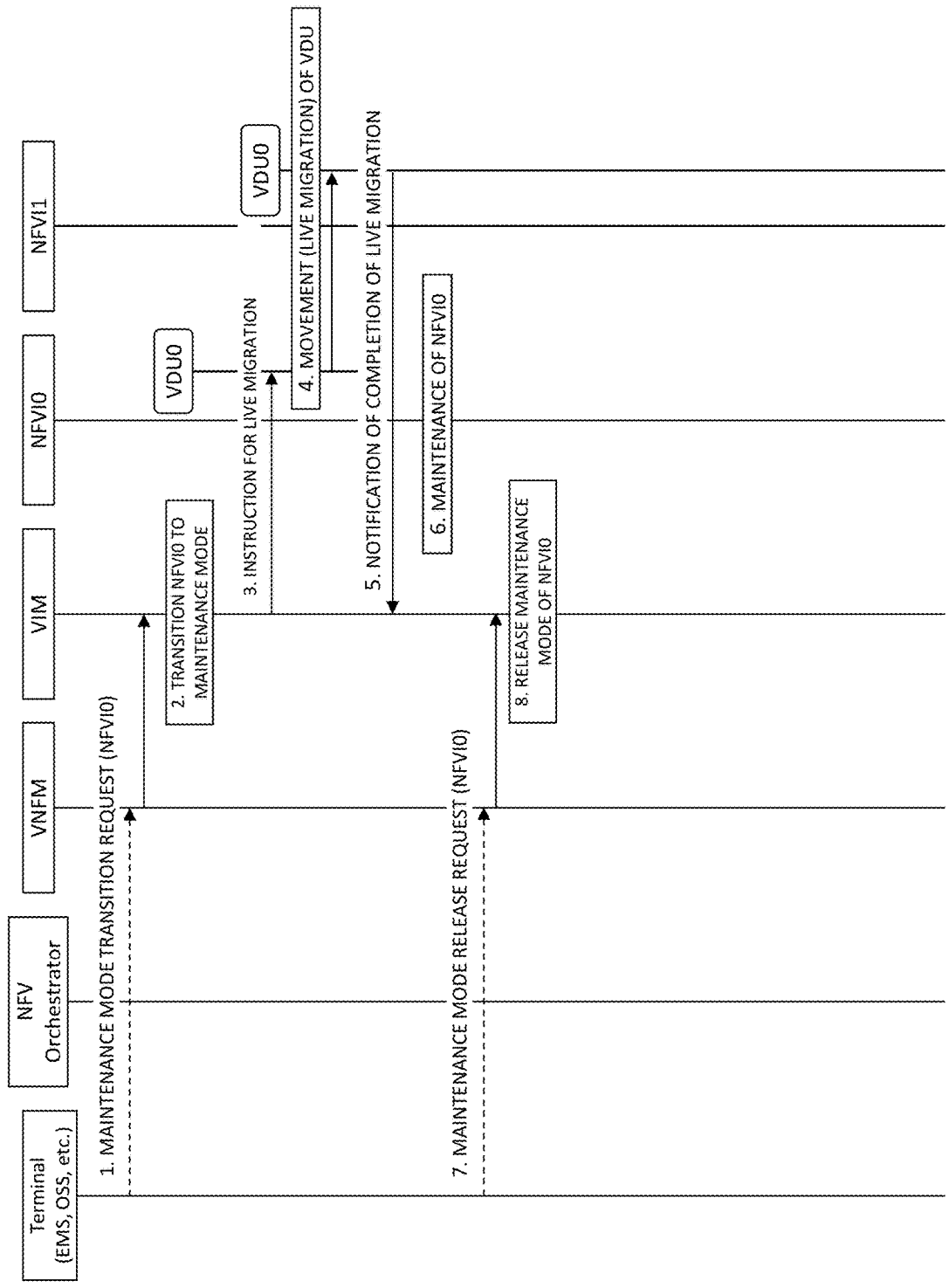
FIG. 12 is a control sequence according to Exemplary Embodiment 1-5.

FIG. 12 illustrates an operation sequence according to Exemplary embodiment 1-5. The basic system configuration according to Exemplary embodiment 1-5 is the same as that illustrated in FIG. 5. According to Exemplary embodiment 1-5, with an operation of a maintenance engineer or the like on a terminal (or an external node), an instruction is sent via VNFM to VIM, and VIM transitions (switches) NFVI0to a maintenance mode.

Referring to FIG. 12, a terminal (Terminal) sends a request for transitioning NFVI0to the maintenance mode to VIM via VNFM (1).

In response to this request, VIM transitions a state of NFVI0 (managed by the VIM) to the maintenance mode (2).

In addition, a request for releasing the maintenance mode of NFVI0from the terminal is sent to the VIM via VNFM (7). In response to this request, VIM releases the maintenance mode of a state of NFVI0 (managed by the VIM) (8). Since the other processing in the sequence is the same as that in FIG. 8, description thereof will be omitted.

According to Exemplary embodiment 1-5, NFVI0in the maintenance mode is removed from selection targets. Thus, it is possible for NFVI0in the maintenance mode to avoid influencing on any of VDUs other than VDU0.

In addition, according to Exemplary embodiment 1-5, since VIM control is performed via VNFM, it is possible to invoke a maintenance mode switch sequence in cooperation with operations/events of EMS, VNFs and so forth.

Further, according to Exemplary embodiment 1-5, instead of an instruction from Terminal, VNFM can become a starting point to issue an instruction (maintenance mode transition/release request) to VIM, using reservation processing or the like.

Exemplary Embodiment 1-6

Figure 13:
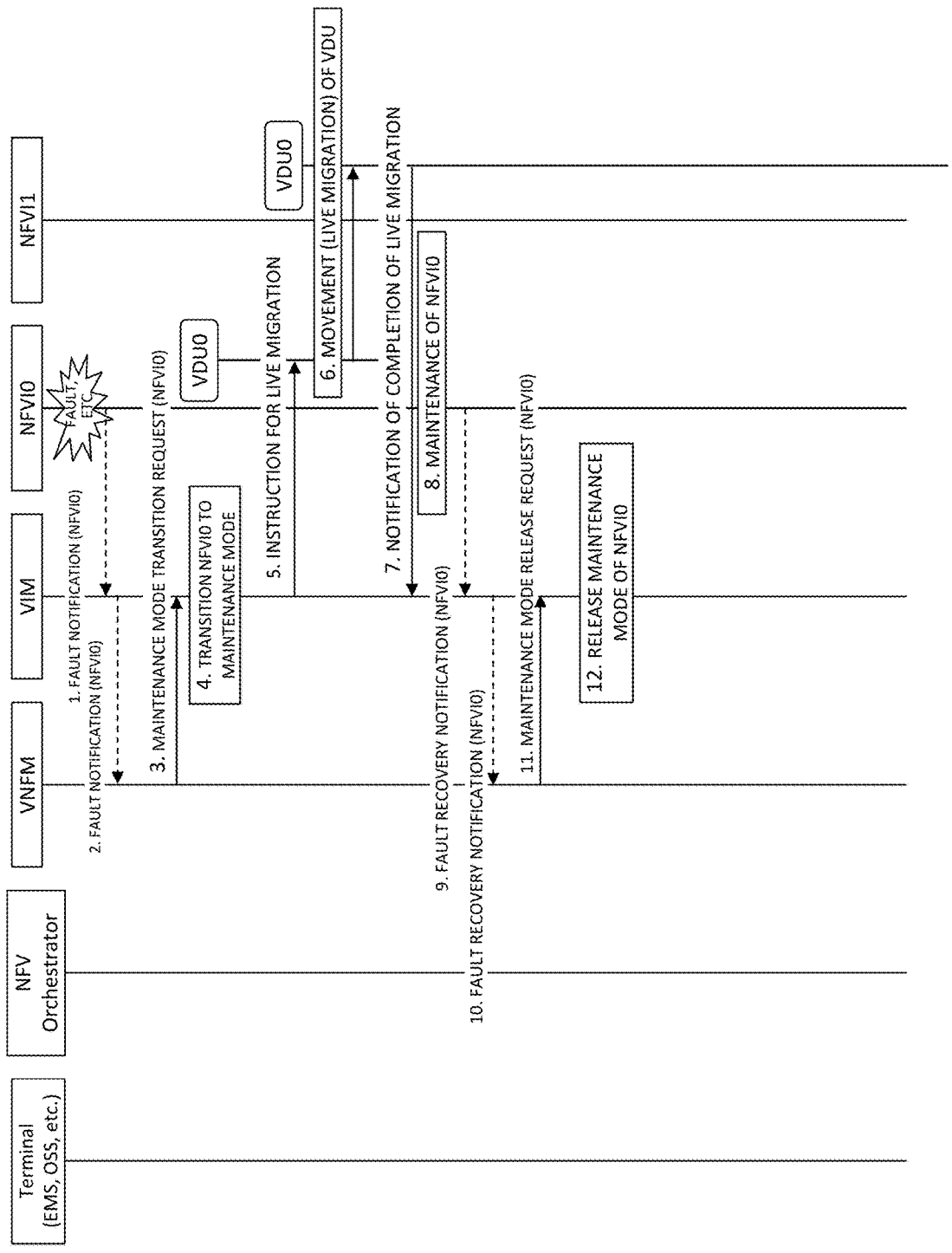
FIG. 13 is a control sequence according to Exemplary Embodiment 1-6.

FIG. 13 illustrates an operation sequence according to Exemplary embodiment 1-6. The basic system configuration according to Exemplary embodiment 1-6 is the same as that illustrated in FIG. 5. According to Exemplary embodiment 1-6, a fault notification of NFVI0is sent from VIM to VNFM, and a request for transitioning NFVI0to a maintenance mode is sent from VNFM to VIM. A fault recovery notification is sent from NFVI0to VNFM, and a maintenance mode release request is also sent from VNFM to VIM via VNFM.

More specifically, referring to FIG. 13, when a fault occurs in NFVI0, a fault notification (NFVI0) from NFVI0is sent to VIM (1). VIM sends the fault notification (NFVI0) to VNFM (2).

VNFM sends a request for transitioning NFVI0to the maintenance mode to VIM (3).

VIM transitions NFVI0to the maintenance mode (4). The subsequent processing until the maintenance of NFVI0(8) is the same as that according to Exemplary embodiment 1 in the FIG. 7.

After the maintenance of NFVI0(8), NFVI0sends a fault recovery notification to VIM (9).

VIM sends the fault recovery notification to VNFM (10).

VNFM sends a request for releasing the maintenance mode of the NFVI0to VIM (11). In response to this request, the VIM releases the maintenance mode of a state of NFVI0(managed by VIM) (12). The other processing in the sequence is the same as that in FIG. 7, description thereof will be omitted.

According to Exemplary embodiment 1-6, NFVI0in the maintenance mode is removed from NFVI selection targets for various kind processing to be performed. Thus, it is possible for NFVI0to avoid influencing on any of VDUs other than VDU0.

According to Exemplary embodiment 1-6, it is possible to perform VIM control with VNFM as a starting point, not via Terminal, when a fault occurs in NFVI0.

Exemplary Embodiment 2

Figure 6:
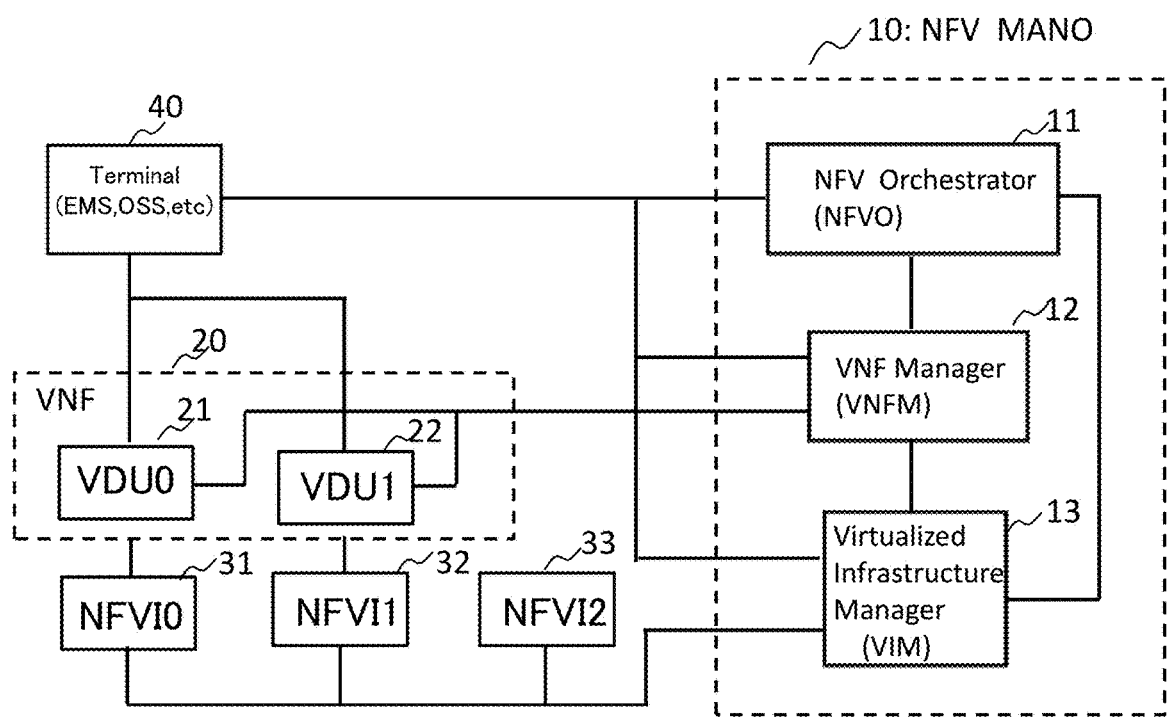
FIG. 6 illustrates an example of a system configuration according to Exemplary Embodiment 2.

FIG. 6 illustrates a system configuration according to Exemplary embodiment 2. As in Exemplary embodiment 1, a terminal (Terminal) 40 may be EMS, OSS, a maintenance terminal, or the like. Reference numeral 10 deSupplementary Note NFV MANO (see FIG. 1), 11 deSupplementary Notes Orchestrator (NFVO), 12 deSupplementary Notes VNF manager (VNFM), 13 deSupplementary Notes a virtualized infrastructure management unit (VIM), 2o deSupplementary Notes VNF, 21 and 21 respectively deSupplementary Note VDU0, and a VDU1. In FIG. 6, there are provided VDU0 and VDU1, with NFVI031 and NFVI1 32, as their respective execution infrastructures (virtualization infrastructures).

Exemplary embodiment 2 corresponds to the above Exemplary basic mode 2. According to Exemplary embodiment 2, system switching is performed between VDU0 of an active system on NFVI0that is a maintenance target and VDU1 of a standby system on NFVI1. In addition, after moving to NFVI2, VDU0 is set to a standby system. Exemplary embodiment 2 can realize no interruption of service, even when a virtual machine (VM) has not live migration function, as in Exemplary embodiment 1.

While FIG. 6 illustrates a duplication configuration including active and standby systems for ease of description, Exemplary embodiment 2 is of course applicable to an N duplication configuration, an N+1 redundancy configuration and so forth.

Basic Operation According to Exemplary Embodiment 2

Figure 14:
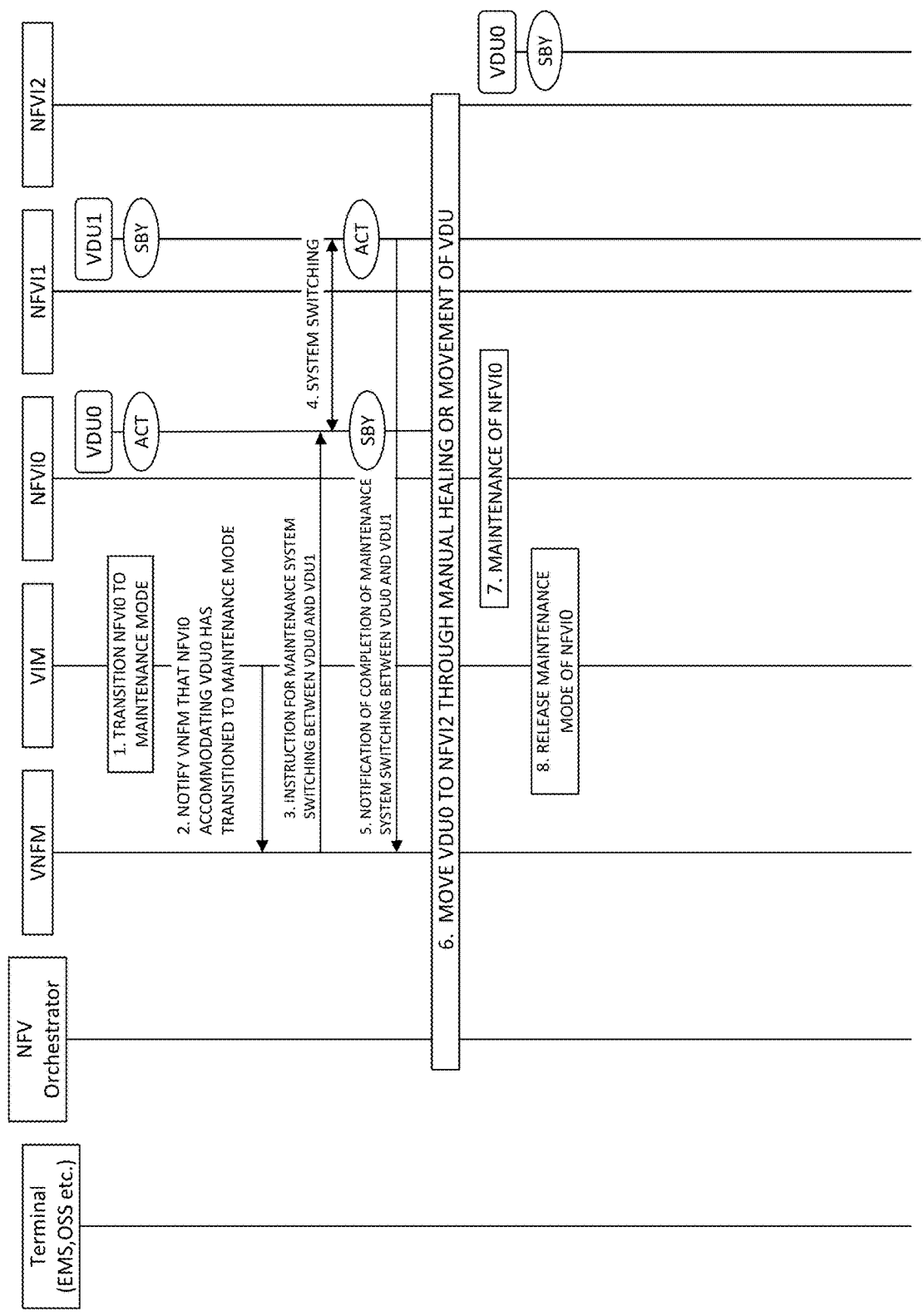
FIG. 14 is a control sequence according to Exemplary Embodiment 2.

FIG. 14 illustrates a basic operation sequence according to Exemplary embodiment 2 illustrated in FIG. 6. In FIG. 14 and the subsequent sequences, the elements in FIG. 6 will be referred to by their names, and the reference numerals of the elements will be omitted. In addition, sequences include sequence numbers.

Referring to FIG. 14, VIM transitions (switches) NFVI0needing maintenance to a maintenance mode (1). In this step, VIM may set "ON" in flag information indicating the maintenance mode, as information about a state of NFVI that is a maintenance target. VIM removes NFVI in the maintenance mode from selection targets (removes from NFVIs candidates to which VM(s) could be allocated). Namely, various kinds of setting control processing or the like (setting or control processing in a normal mode) from VIM to NFVI is not performed.

VIM notifies VNFM that NFVI0accommodating VDU0 has transitioned to a maintenance mode (2).

VNFM sends to VDU0 an instruction for maintenance system switching between VDU0 and VDU1 forming a duplication configuration (3).

Next, the system switching is performed (4), and VDU1 and VDU0 are transitioned to an active system (ACT) and a standby system (SBY), respectively.

VDU1 of an active system (ACT) sends a switching completion notification of the maintenance system to VNFM (5).

Through manual healing or movement of VDU0 of a standby system, VDU0 is moved to NFVI2 (6).

Maintenance on NFVI0is performed (7).

Next, VIM releases the maintenance mode of NFVI0(8).

According to Exemplary embodiment 2, while the maintenance on NFVI0is being performed (7), VDU1 on NFVI1operates as an active system and VDU0 on NFVI2 performs standby operation as a standby system. Namely, even while the maintenance of NFVI0is being performed (7), the duplication system formed by active and standby systems functions.

According to Exemplary embodiment 2, unlike Reference example 2 described with reference to FIG. 4, there is no service interruption during when system switching by a set of VDU0/VDU1 is performed. According to Exemplary embodiment 2, VDU0 of an active system operates (providing a service(s)) until immediately before the system switching being performed. For example, by performing system switching based on hot standby, VDU1 of a standby system instantly switches to an active system and takes over processing of VDU0, which has been of an active system. In addition, during maintenance of NFVI0(7), VDU1 and VDU0 function as a duplication system of active and standby systems.

In contrast, according to Reference example 2 described with reference to FIG. 4, during the maintenance of NFVI0 (1), VDU0 of an active system does not operate, results in service interruption, and the duplication system does not function. In addition, VDU1 on NFVI1is left to a standby system. According to Reference example 2, when a fault is detected in an active system, VDU1 of a standby system is transitioned to an active (ACT) system. However, until healing is started upon detection of a fault in NFVI0or VDU0, VDU0 is moved to NFVI2, and VDU0 starts to be as a standby system, a single system operation by only VDU1 that is a new active system, is performed (a duplication system cannot operate).

According to Exemplary embodiment 2, through manual healing (manual reconfiguration from fault) (or movement of VDU0 to NFVI2), no fault detection processing time is needed. Thus, a single system operation time (time during when only VDU1 of an active system operates) is short.

In addition, according to Exemplary embodiment 2, sequences as a whole can be managed by VNFM in a centralized manner.

Exemplary Embodiment 3

Figure 15:
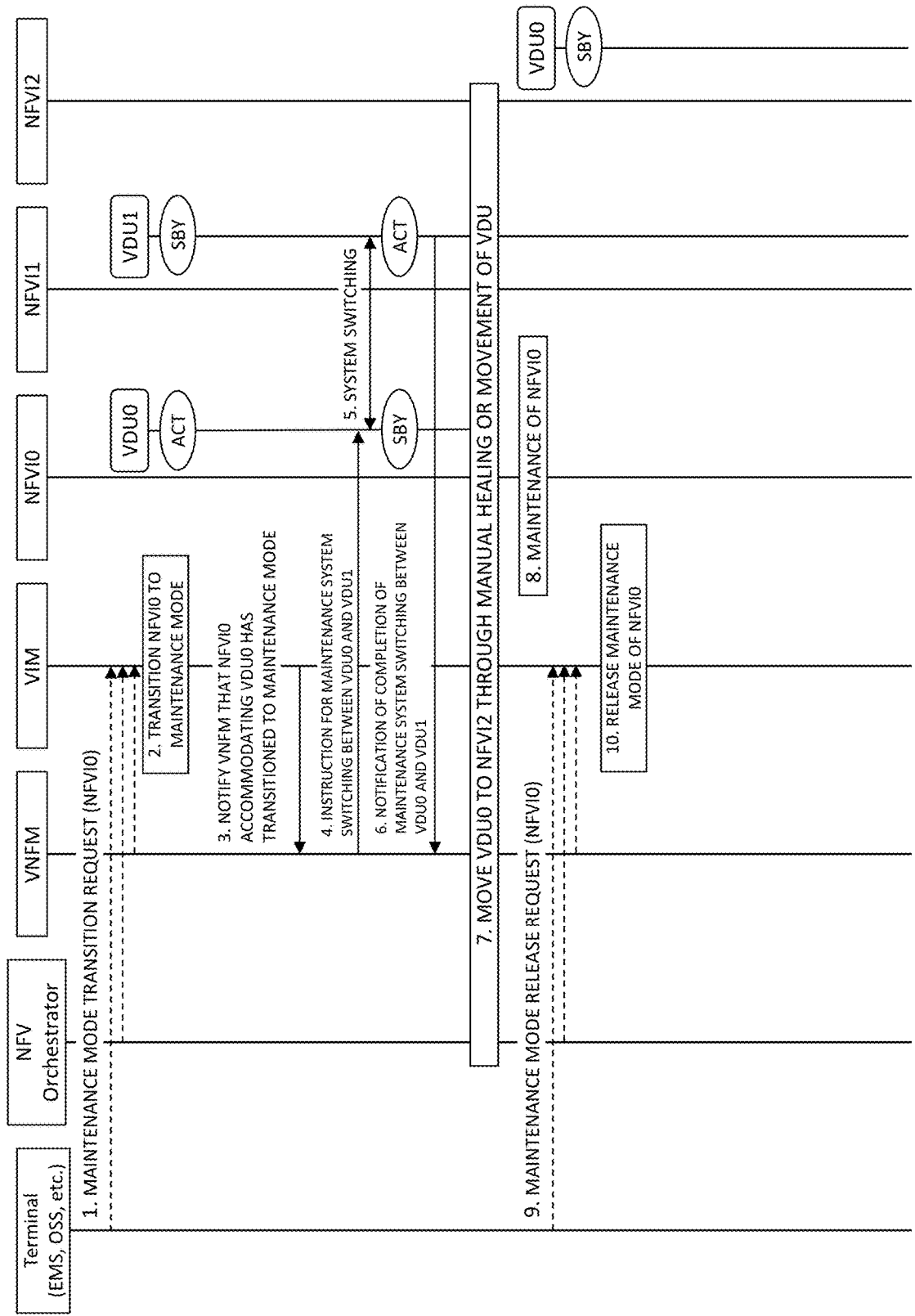
FIG. 15 is a control sequence according to Exemplary Embodiment 3.

FIG. 15 illustrates an operation sequence according to Exemplary embodiment 3. The basic system configuration according to Exemplary embodiment 3 is the same as that illustrated in FIG. 6. In FIG. 15, the elements in FIG. 6 will be referred to by their names, and the reference numerals of the elements will be omitted. Each sequence has a sequence number allotted.

Referring to FIG. 15, a request for transitioning NFVI0to the maintenance mode to VIM is sent (1). Any one of the terminal (EMS, OSS, etc.), Orchestrator, and VNFM sends a maintenance mode transition request. The cases where a sending source of the maintenance mode transition request is any one of Terminal, Orchestrator, and VNFM have already been described in the above Exemplary embodiments 1-2, 1-3, 1-4, etc. for example. Thus, depending on whether the sending source of the maintenance mode transition request is Terminal, Orchestrator, or VNFM, Exemplary embodiment 3 can be developed respectively into Exemplary embodiment 3-1, 3-2, 3-3, etc. However, here, these embodiments will collectively be described as Exemplary embodiment 3, only for the sake of simplicity.

Since the subsequent processing until the maintenance of NFVI0(8) in the sequence is the same as that in FIG. 14, description thereof will be omitted.

Any one of Terminal, Orchestrator, and VNFM sends the maintenance mode release request to VIM.

According to Exemplary embodiment 3, through manual healing (or movement(move) of the VDU), no fault detection processing time is needed. Thus, the time during when only a single system operates is short. In addition, VNFM can manage entire sequences in a centralized manner. As in the Exemplary embodiment 2, there is no service interruption by a set of VDU0/1.

Exemplary Embodiment 4

Figure 16:
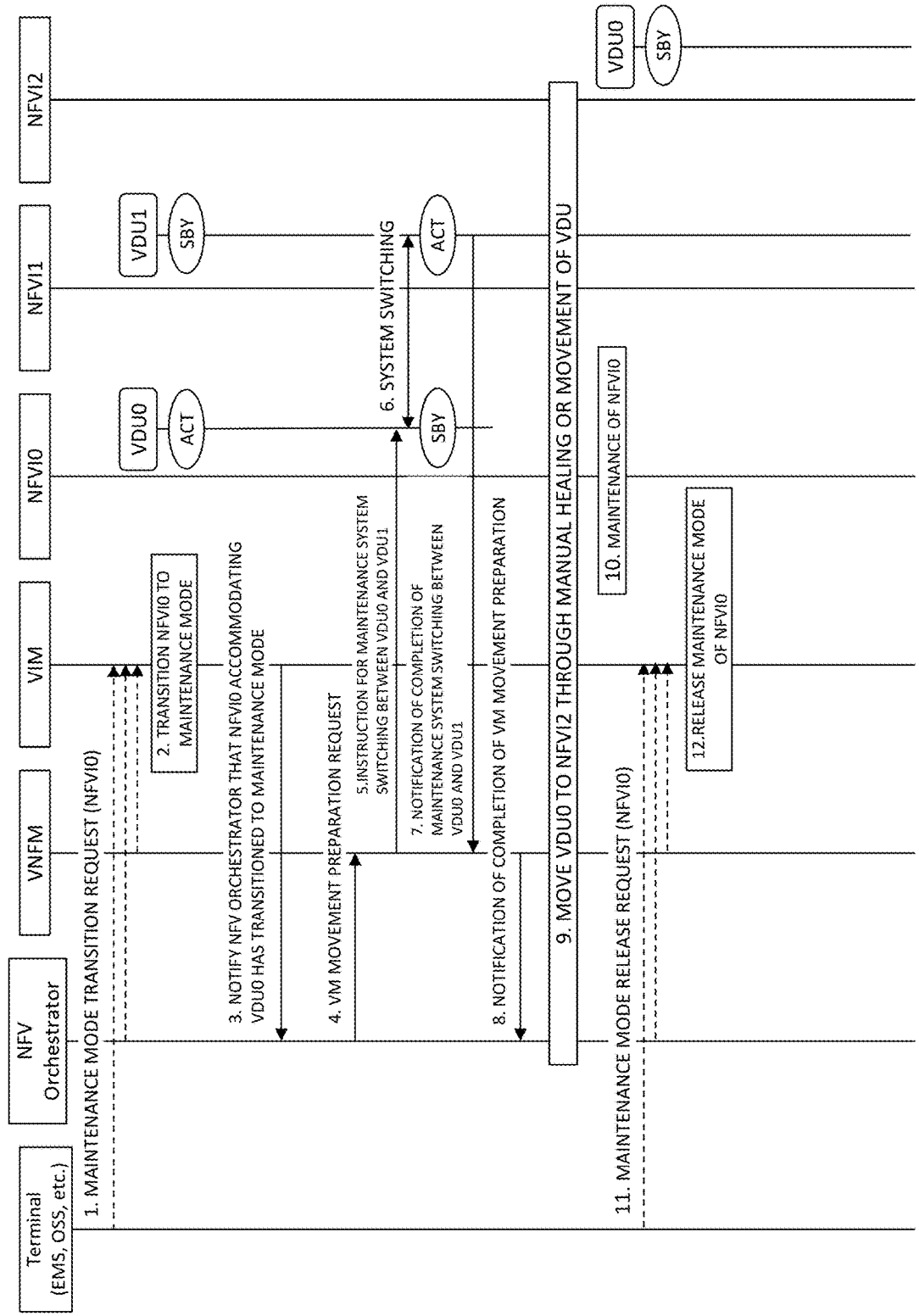
FIG. 16 is a control sequence according to Exemplary Embodiment 4.

FIG. 16 illustrates an operation sequence according to Exemplary embodiment 4. The basic system configuration according to Exemplary embodiment 4 is the same as that illustrated in FIG. 6. In FIG. 16, the elements in FIG. 6 will be referred to by their names, and the reference numerals of the elements will be omitted. In addition, each sequence is given a sequence number. According to the above Exemplary embodiments 2 and 3, VIM notifies VNFM that NFVI0accommodating VDU0 has transitioned to a maintenance mode, and VNFM manages relevant sequences in a centralized manner. In contrast, according to Exemplary embodiment 4, VIM notifies Orchestrator that NFVI0has transitioned to a maintenance mode, and Orchestrator manages relevant sequences in a centralized manner.

Referring to FIG. 16, a request for transitioning NFVI0to the maintenance mode is sent to VIM (1). A sending source of a maintenance mode transition request is any one of Terminal, Orchestrator, and VNFM.

VIM transitions (switches) NFVI0to the maintenance mode (2).

VIM notifies Orchestrator that NFVI0accommodating VDU0 has transitioned to the maintenance mode (3).

Orchestrator requests VNFM to prepare for movement of a virtual machine (VM) by transmitting a VM movement preparation request to VNFM (4).

On reception of the VM movement preparation request, VNFM sends to VDU0 an instruction for maintenance system switching between VDU0 and VDU1 forming a duplication configuration (5).

Next, the system switching is performed (6), and VDU1 and VDU0 transition to an active system (ACT) and a standby system (SBY), respectively.

VDU1 of an active system (ACT) sends a completion notification of the maintenance system switching to VNFM (7).

VNFM sends a completion notification of the VM movement preparation to Orchestrator (8).

Through manual healing or movement of VDU of a standby system, VDU0 is moved to NFVI2 (9).

Maintenance of NFVI0is performed (10).

Any one of Terminal, Orchestrator, and VNFM, which is a sending source of the maintenance mode transition request, sends a request for releasing the maintenance mode of NFVI0to VIM (11).

VIM releases the maintenance mode of NFVI0(12).

According to Exemplary embodiment 4, unlike Reference example 2 described with reference to FIG. 4, there is no service interruption by a set of VDU0/VDU1.

In addition, according to Exemplary embodiment 4, through manual healing (or movement of the VDU), no fault detection processing time is needed. Thus, a single system operation time is short.

In addition, according to Exemplary embodiment 4, Orchestrator can manage whole sequences in a centralized manner.

Exemplary Embodiment 5

Figure 17:
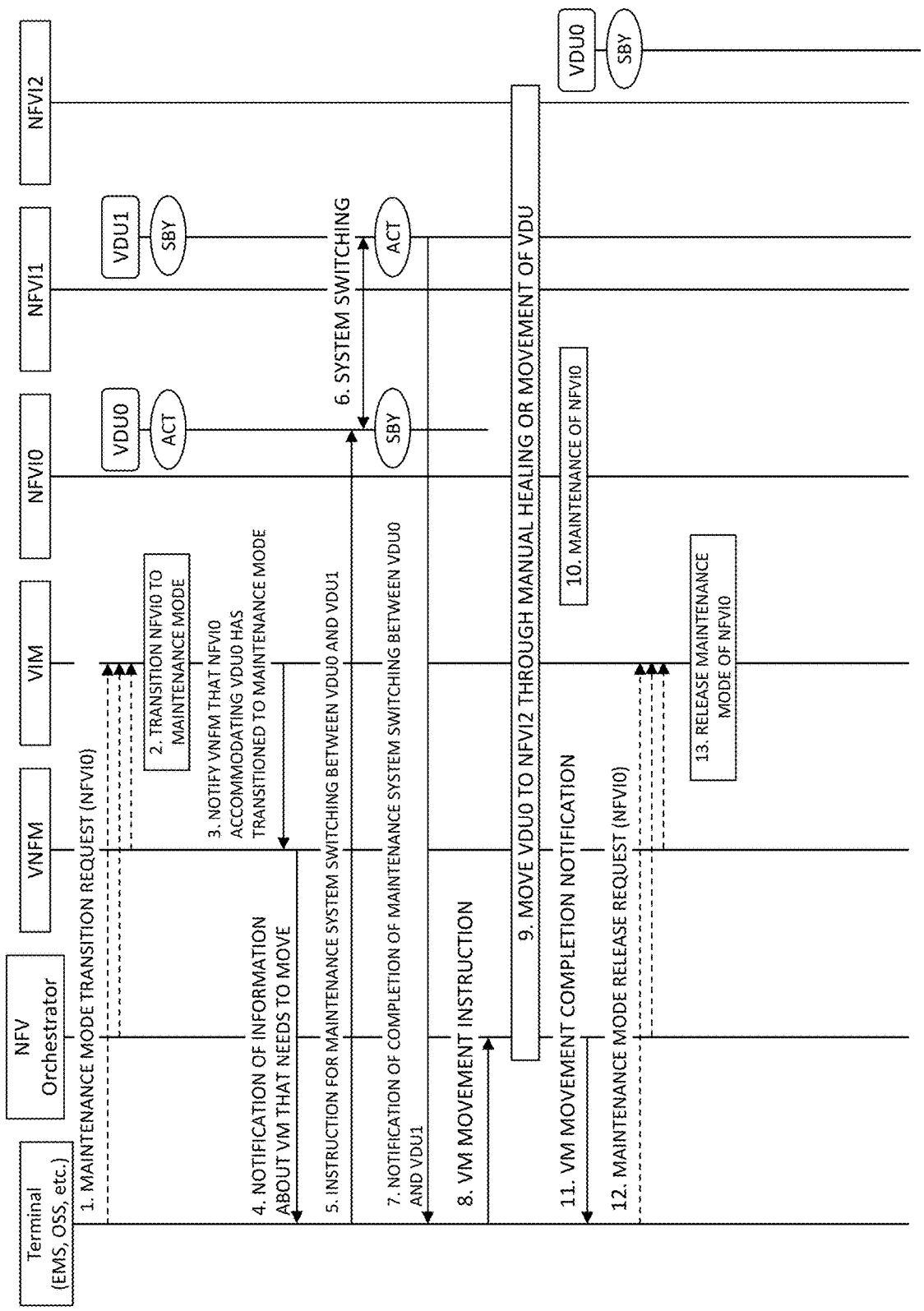
FIG. 17 is a control sequence according to Exemplary Embodiment 5.

FIG. 17 illustrates an operation sequence according to Exemplary embodiment 5. The basic system configuration according to Exemplary embodiment 5 is the same as that illustrated in FIG. 6. In FIG. 17, the elements in FIG. 6 will be referred to by their names, and the reference numerals of the elements will be omitted. In addition, each sequence is given a sequence number. According to Exemplary embodiment 5, for example, through operation on Terminal, Orchestrator in a NFV-MANO manages the entire sequence in a centralized manner.

A request for transitioning NFVI0to a maintenance mode to VIM is sent (1). A sending source of the maintenance mode transition request is any one of Terminal, Orchestrator, and VNFM. The cases where the sending source of the maintenance mode transition request is any one of Terminal, Orchestrator, and VNFM have already been described in the above Exemplary embodiments 1-2, 1-3, 1-4, etc. for example. Thus, depending on whether the sending source of the maintenance mode transition request is Terminal, Orchestrator, or VNFM, Exemplary embodiment 5 can be developed into Exemplary embodiment 5-1, 5-2, 5-3, etc. However, only for the sake of simplicity, these embodiments will collectively be described as Exemplary embodiment 5.

VIM transitions (switches) NFVI0to a maintenance mode (2).

VNFM notifies Terminal of information on VM that needs to move (4).

The terminal sends to VDU0 (5) an instruction for maintenance system switching between VDU0 and VDU1 forming a duplication configuration.

Next, the system switching is performed (6), and VDU1 and VDU0 transition to an active system (ACT) and a standby system (SBY), respectively.

VDU1 of an active system (ACT) sends a completion notification of the maintenance system switching to the terminal (7). In this step, VDU1 may transmit the notification via at least one of VIM, VNFM, and Orchestrator. Alternatively, VDU1 may transmit the notification, for example, via another communication network connected to Terminal (not via NFV-MANO).

The terminal sends a VM movement instruction to Orchestrator (8).

Through manual healing or movement of the VDU of a standby system, VDU0 is moved to NFVI2 (9).

Maintenance of NFVI0is performed (10).

Orchestrator sends a VM movement completion notification to the terminal (11).

Any one of Terminal, Orchestrator, and VNFM, which is a sending source of the maintenance mode transition request, sends a request for releasing the maintenance mode of NFVI0 to VIM (12).

VIM releases the maintenance mode of NFVI0(13).

According to Exemplary embodiment 5, unlike Reference example 2 described with reference to FIG. 4, there is no service interruption by a set of VDU0/VDU1.

In addition, according to Exemplary embodiment 5, through manual healing (or movement of the VDU), no fault detection processing time is needed. Thus, a time during when only the single VDU1 of an active system operates is short.

In addition, according to Exemplary embodiment 5, with an operation on Terminal, Orchestrator can manage entire sequence in a centralized manner.

Exemplary Embodiment 6

Figure 18:
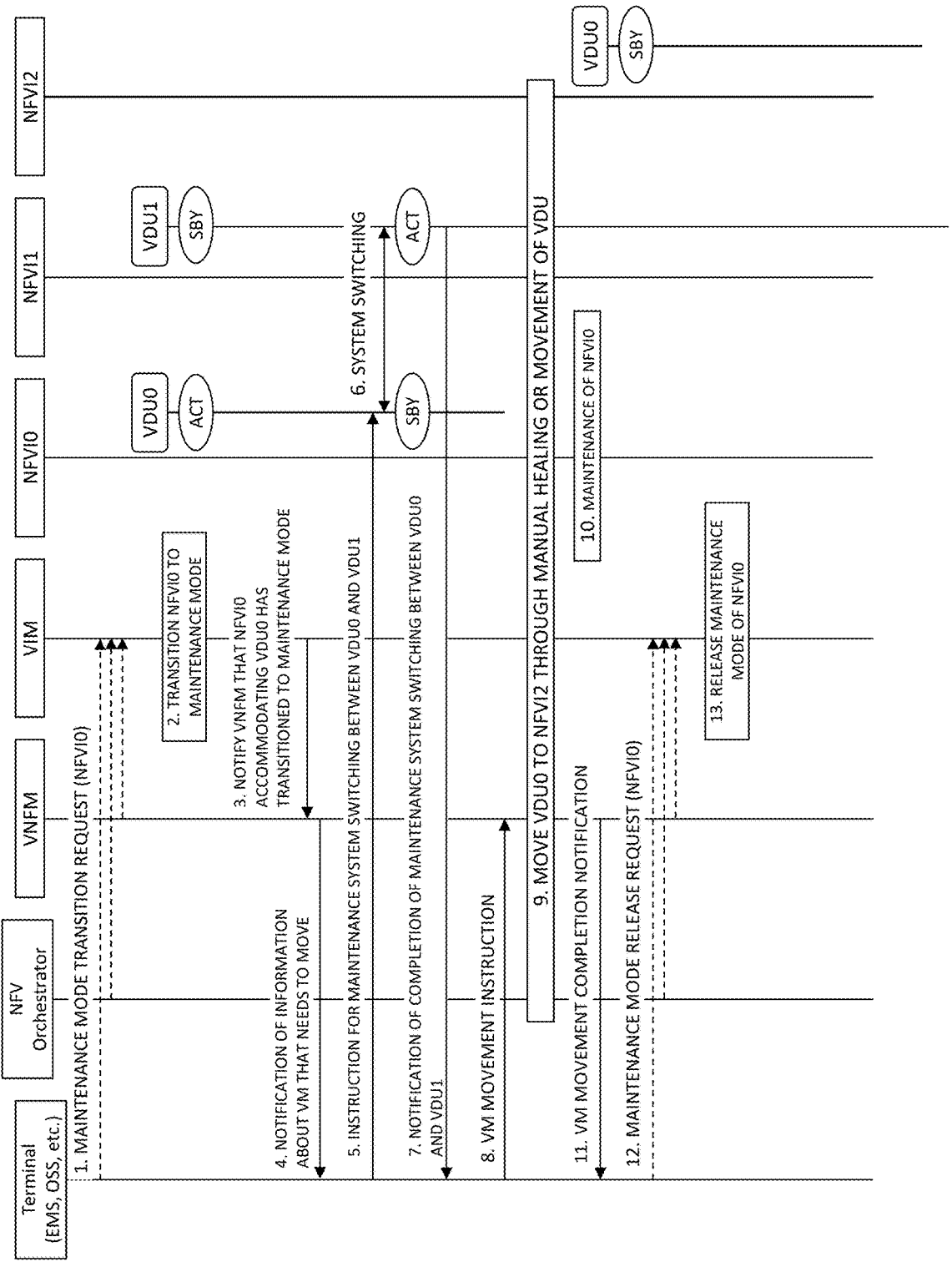
FIG. 18 is a control sequence according to Exemplary Embodiment 6.

FIG. 18 illustrates an operation sequence according to Exemplary embodiment 6. The basic system configuration according to Exemplary embodiment 6 is the same as that illustrated in FIG. 6. In FIG. 18, the elements in FIG. 6 will be referred to by their names, and the reference numerals of the elements will be omitted. In addition, each sequence is given a sequence number. According to Exemplary embodiment 6, for example, with an operation on Terminal, Orchestrator in NFV-MANO manages entire sequence in a centralized manner.

A request for transitioning NFVI0to the maintenance mode to VIM is sent (1). A sending source of the maintenance mode transition request is any one of Terminal, Orchestrator, and VNFM. The cases where the sending source of the maintenance mode transition request is any one of Terminal, Orchestrator, and VNFM have already been described in the above Exemplary embodiments 1-2, 1-3, 1-4, etc. for example. Thus, depending on whether the sending source of the maintenance mode transition request is Terminal, Orchestrator, or VNFM, Exemplary embodiment 6 can be developed respectively into Exemplary embodiment 6-1, 6-2, 6-3, etc. However, only for the sake of simplicity, these cases will collectively be described as Exemplary embodiment 6.

VIM transitions (switches) NFVI0to the maintenance mode (2).

VNFM notifies Terminal of information on VM that needs to move (4).

Terminal sends to VDU0 an instruction for maintenance system switching between VDU0 and VDU1 forming a duplication configuration (5).

Next, the system switching is performed (6), and VDU1 and VDU0 transition to an active system (ACT) and a standby system (SBY), respectively.

VDU1 of an active system (ACT) sends a completion notification of the maintenance system switching to the terminal (7). In this step, VDU1 may transmit the notification via at least one of the VIM, VNFM, and Orchestrator. Alternatively, VDU1 may transmit the notification, for example, via another communication network connected to Terminal (not via NFV-MANO).

Terminal sends a VM movement instruction to VNFM (8).

Through manual healing or movement of the VDU of a standby system, VDU0 is moved to NFVI2 (9).

Maintenance of NFVI0is performed (10).

VNFM sends a VM movement completion notification to Terminal (11).

Any one of Terminal, Orchestrator, and VNFM, which is a sending source of the maintenance mode transition request, sends a request for releasing the maintenance mode of NFVI0to VIM (12).

VIM releases the maintenance mode of NFVI0(13).

According to Exemplary embodiment 6, as in Exemplary embodiment 2 and unlike Reference example 2 described with reference to FIG. 4, there is no service interruption by a set of VDU0/VDU1.

In addition, according to Exemplary embodiment 6, through manual healing (or movement of the VDU), no fault detection processing time is needed. Thus, a single system operation time is short.

In addition, according to Exemplary embodiment 6, with an operation on Terminal, NVFM can manage entire sequence in a centralized manner.

While Exemplary embodiments 2 to 6 have been applied to a duplication configuration (a single active system and a single standby system) as a redundancy configuration. These embodiments are of course applicable to an N+1 redundancy configuration.

The disclosure of each of the above PTL and NPL is incorporated herein by reference thereto. Variations and adjustments of the Exemplary embodiments and examples are possible within the scope of the overall disclosure (including the claims) of the present invention and based on the basic technical concept of the present invention. Various combinations and selections of various disclosed elements (including the elements in each of the claims, examples, drawings, etc.) are possible within the scope of the claims of the present invention. Namely, the present invention of course includes various variations and modifications that could be made by those skilled in the art according to the overall disclosure including the claims and the technical concept.

The above Exemplary embodiments can be described as follows, but not limited thereto.

(Supplementary Note 1)

A management apparatus, including:

a maintenance mode setting unit that transitions a first virtualization infrastructure (Network Functions Virtualization Infrastructure: NFVI) to a maintenance mode;

a mobility control unit that at least instructs a virtualization deployment unit (VDU) on the first virtualization infrastructure in the maintenance mode to move to a second virtualization infrastructure; and a maintenance mode release unit that releases the maintenance mode of the first virtualization infrastructure.

(Supplementary Note 2)

The management apparatus according to Supplementary Note 1, wherein the management apparatus constitutes a virtualized infrastructure management unit (Virtualized Infrastructure Manager; VIM), wherein a sending source that sends at least one of a request for transitioning the first virtualization infrastructure to the maintenance mode and a request for releasing the maintenance mode of the first virtualization infrastructure to the management apparatus (VIM) is a terminal, a network functions virtualization (NFV) orchestrator (NFVO), or a virtual network function (VNF) management unit (Virtual Network Function manager: VNFM) that manages a virtual network function(s), and wherein, based on the request from the sending source, at least one of the transition of the first virtualization infrastructure to the maintenance mode by the maintenance mode setting unit and the release of the maintenance mode of the first virtualization infrastructure by the maintenance mode release unit is performed.

(Supplementary Note 3)

The management apparatus according to Supplementary Note 2, wherein the terminal is a maintenance terminal, an EMS (Element Management System), or an OSS (Operations Support Systems).

(Supplementary Note 4)

The management apparatus according to Supplementary Note 3, wherein the apparatus receives the request for transitioning the first virtualization infrastructure to the maintenance mode from the terminal via at least one of the network functions virtualization orchestrator (NFVO) and the virtual network function management unit (VNFM).

(Supplementary Note 5)

The management apparatus according to Supplementary Note 3, wherein the apparatus receives the request for releasing the maintenance mode of the first virtualization infrastructure from the terminal via at least one of the network functions virtualization orchestrator (NFVO) and the virtual network function management unit (VNFM).

(Supplementary Note 6)

The management apparatus according to Supplementary Note 2, wherein the apparatus notifies a fault notification transmitted from the first virtualization infrastructure to the network functions virtualization orchestrator (NFVO) directly or via the virtual network function management unit (VNFM), and receives the request for transitioning the first virtualization infrastructure to the maintenance mode, a sending source of the request being the network functions virtualization orchestrator (NFVO).

(Supplementary Note 7)

The management apparatus according to Supplementary Note 6, wherein the apparatus receives the request for transitioning the first virtualization infrastructure to the maintenance mode, a sending source of the request being the virtual network function management unit (VNFM).

(Supplementary Note 8)

The management apparatus according to any one of Supplementary Notes 1 to 7, wherein the mobility control unit includes:

a movement instruction transmission unit that transmits an instruction for movement to the second virtualization infrastructure to a virtualization deployment unit (VDU) on the first virtualization infrastructure; and a movement completion reception unit that receives a completion notification of the movement of the virtualization deployment unit (VDU) to the second virtualization infrastructure.

(Supplementary Note 9)

A management apparatus, including:

a maintenance mode setting unit that transitions a first virtualization infrastructure to a maintenance mode;

a system switching control unit that at least instructs system switching between a first virtualization deployment unit (VDU0) of an active system on the first virtualization infrastructure, and a second virtualization deployment unit (VDU1) of a standby system on a second virtualization infrastructure; and a maintenance mode release unit that releases the maintenance mode of the first virtualization infrastructure.

(Supplementary Note 10)

The management apparatus according to Supplementary Note 9, wherein the system switching control unit includes:

a system switching instruction transmission unit that transmits an instruction for system switching between the first virtualization deployment unit (VDU0) of an active system on the first virtualization infrastructure, and the second virtualization deployment unit (VDU1) of a standby system on the second virtualization infrastructure, to the first virtualization deployment unit (VDU0) in an active system; and a system switching completion reception unit that receives a completion notification of the switching of the first virtualization deployment unit (VDU0) to a standby system and the switching of the second virtualization deployment unit (VDU1) to an active system from the second virtualization deployment unit (VDU1).

(Supplementary Note 11)

The management apparatus according to Supplementary Note 10, wherein, after the system switching completion reception unit receives the notification of the completion of the system switching, when the first virtualization deployment unit (VDU0) of a standby system has moved to a third virtualization infrastructure and when maintenance on the first virtualization infrastructure has been finished, the maintenance mode release unit releases the maintenance mode of the first virtualization infrastructure.

(Supplementary Note 12)

The management apparatus according to Supplementary Note 10 or 11, including:

a virtualized infrastructure management unit (Virtualized Infrastructure Manager; VIM), which is a management apparatus controlling a virtualization infrastructure(s) (NFVIs) and which includes the maintenance mode setting unit and the maintenance mode release unit;

wherein a sending source that sends at least one of a request for transitioning the first virtualization infrastructure to the maintenance mode and a request for releasing the maintenance mode of the first virtualization infrastructure to the virtualized infrastructure management unit (VIM) is a terminal or an upper apparatus of the virtualized infrastructure manager, and wherein, based on the request from the terminal or the upper apparatus, at least one of the transition of the first virtualization infrastructure to the maintenance mode by the maintenance mode setting unit and the release of the maintenance mode of the first virtualization infrastructure by the maintenance mode release unit is performed.

(Supplementary Note 13)

The management apparatus according to Supplementary Note 12, wherein the upper apparatus is a network functions virtualization orchestrator (NFV Orchestrator: NFVO) or a virtual network function management unit (VNF Manager: VNFM) that manages a virtual network function(s).

(Supplementary Note 14)

The management apparatus according to Supplementary Note 13, wherein the virtualized infrastructure management unit (VIM) receives the request for transitioning the first virtualization infrastructure to the maintenance mode from the terminal via the network functions virtualization orchestrator (NFVO) or the virtual network function management unit (VNFM).

(Supplementary Note 15)

The management apparatus according to Supplementary Note 14, wherein the virtualized infrastructure management unit (VIM) receives the request for releasing the maintenance mode of the first virtualization infrastructure from the terminal via the network functions virtualization orchestrator (NFVO) or the virtual network function management unit (VNFM).

(Supplementary Note 16)

The management apparatus according to Supplementary Note 13, wherein, when the virtualized infrastructure management unit (VIM) receives a fault notification from the first virtualization infrastructure, the virtualized infrastructure management unit (VIM) sends the fault notification to the network functions virtualization orchestrator (NFVO) directly or via the virtual network function management unit (VNFM), and wherein the virtualized infrastructure management unit (VIM) receives the request for transitioning the first virtualization infrastructure to the maintenance mode, a sending source of the request being the network functions virtualization orchestrator (NFVO).

(Supplementary Note 17)

The management apparatus according to Supplementary Note 13, wherein, when the virtualized infrastructure management unit (VIM) receives a fault notification from the first virtualization infrastructure, the virtualized infrastructure management unit (VIM) sends the fault notification to the virtual network function management unit (VNFM), and wherein the virtualized infrastructure management unit (VIM) receives the request for transitioning the first virtualization infrastructure to the maintenance mode, a sending source of the request being the virtual network function management unit (VNFM).

(Supplementary Note 18)

The management apparatus according to Supplementary Note 16 or 17, wherein the virtual network function management unit (VNFM) includes the system switching instruction transmission unit and the system switching completion reception unit, and wherein, when the virtual network function management unit (VNFM) is notified by the virtualized infrastructure manager that the first virtualization infrastructure transitions to the maintenance mode, the virtual network function management unit (VNFM) sends the system switching instruction.

(Supplementary Note 19)

The management apparatus according to Supplementary Note 13, wherein, when the terminal is notified by the virtualized infrastructure manager that the first virtualization infrastructure transitions to the maintenance mode, the terminal sends the system switching instruction as the system switching instruction transmission unit, and wherein the terminal receives the system switching completion notification as the system switching completion reception unit.

(Supplementary Note 20)

A network management system, including:

a virtualized infrastructure management unit (Virtualized Infrastructure Manager; VIM) that controls a network functions virtualization infrastructure(s) (NFVI) on which a virtual machine(s) is executed;

first and second virtualization infrastructures; and a terminal or an upper apparatus of the virtualized infrastructure manager, wherein the virtualized infrastructure manager receives a request for transitioning the first virtualization infrastructure to a maintenance mode from the terminal or the upper apparatus, transitions the first virtualization infrastructure to the maintenance mode, and instructs movement of a virtualization deployment unit (VDU) on the first virtualization infrastructure to the second virtualization infrastructure, and wherein, after the virtualization deployment unit moves to the second virtualization infrastructure and maintenance on the first virtualization infrastructure is finished, the virtualized infrastructure manager receives a request for releasing the maintenance mode of the first virtualization infrastructure from the terminal or the upper apparatus and releases the maintenance mode of the first virtualization infrastructure.

(Supplementary Note 21)

A network management system, including:

a virtualized infrastructure management unit (Virtualized Infrastructure Manager; VIM) that controls a network functions virtualization infrastructure(s) (NFVI) on which a virtual machine(s) is executed;

first, second, and third virtualization infrastructures;

an upper apparatus of the virtualized infrastructure manager; and a terminal, wherein first and second virtualization deployment units (VDUs) on the first and second virtualization infrastructures form a redundancy configuration by serving as active and standby systems, respectively, wherein, when the virtualized infrastructure manager receives a request for transitioning the first virtualization infrastructure to a maintenance mode from the terminal or the upper apparatus, the virtualized infrastructure manager transitions the first virtualization infrastructure to the maintenance mode and notifies the upper apparatus or the terminal of the transitioning, wherein the upper apparatus or the terminal instructs system switching between a first virtualization deployment unit (VDU0) on the first virtualization infrastructure and a second virtualization deployment unit (VDU1) on the second virtualization infrastructure, wherein, the virtualized infrastructure manager receives a system switching completion notification indicating that the first virtualization deployment unit (VDU0) has switched to serve as a standby system and that the second virtualization deployment unit (VDU1) has switched to an active system, and wherein, after the first virtualization deployment unit (VDU0) moves to the third virtualization infrastructure and maintenance on the first virtualization infrastructure is performed, the virtualized infrastructure manager releases the maintenance mode of the first virtualization infrastructure.

(Supplementary Note 22)

A management method, including:

transitioning a first virtualization infrastructure (Network Functions Virtualization Infrastructure: NFVI), which is a maintenance target, to a maintenance mode;

transmitting an instruction for movement of a virtualization deployment unit (Virtualization Deployment Unit: VDU) on the first virtualization infrastructure to a second virtualization infrastructure; and releasing the maintenance mode of the first virtualization infrastructure after a completion notification of the movement of the virtualization deployment unit (VDU) to the second virtualization infrastructure is received and maintenance is finished.

(Supplementary Note 23)

A management method, including:

transitioning a first virtualization infrastructure that is a maintenance target, to a maintenance mode;

transmitting an instruction for system switching between a first virtualization deployment unit (VDU0) of an active system on the first virtualization infrastructure, and a second virtualization deployment unit (VDU1) of a standby system on a second virtualization infrastructure; and releasing the maintenance mode of the first virtualization infrastructure after the first and second virtualization deployment units (VDU0) and (VDU1) switch to serve as the standby and active systems, respectively, the first virtualization deployment unit (VDU0) of a standby system moves to a third virtualization infrastructure, and maintenance on the first virtualization infrastructure is finished.

(Supplementary Note 24)

The management method according to Supplementary Note 23, wherein a sending source that sends at least one of a request for transitioning the first virtualization infrastructure to the maintenance mode and a request for releasing the maintenance mode of the first virtualization infrastructure to the management apparatus (VIM) is a terminal or an upper apparatus, and wherein, based on the request from the terminal or the upper apparatus, at least the transition of the first virtualization infrastructure to the maintenance mode and the release of the maintenance mode of the first virtualization infrastructure is performed.

(Supplementary Note 25)

The management method according to Supplementary Note 24, wherein the upper apparatus is an orchestrator that performs management and integration of network functions virtualization (NFV) or a virtual network function (VNF) manager that manages a virtual network function(s) (VNF).

(Supplementary Note 26)

A non-transitory computer-readable recording medium storing therein a program, causing a computer to execute processing comprising:

transitioning a first virtualization infrastructure to a maintenance mode;

transmitting an instruction for movement of a virtualization deployment unit (VDU) on the first virtualization infrastructure to a second virtualization infrastructure;

receiving a completion notification of the movement of the virtualization deployment unit (VDU) to the second virtualization infrastructure; and releasing the maintenance mode of the first virtualization infrastructure.

(Supplementary Note 27)

A non-transitory computer-readable recording medium storing therein a program, causing a computer to execute processing comprising:

transitioning a first virtualization infrastructure to a maintenance mode;

transmitting an instruction for system switching between a first virtualization deployment unit (VDU0) of an active system on the first virtualization infrastructure, and a second virtualization deployment unit (VDU1) of a standby system on a second virtualization infrastructure;

receiving a completion notification of the switching of the first and second virtualization deployment units (VDU0) and (VDU1) to the standby and active systems, respectively; and releasing the maintenance mode of the first virtualization infrastructure after the first virtualization deployment unit (VDU0) of a standby system moves to a third virtualization infrastructure and maintenance on the first virtualization infrastructure is finished.

The invention claimed is:

1. A management apparatus for performing system switching between an active and standby systems on network functions virtualization infrastructures, comprising:
a processor; and
a memory storing program instructions that when executed by the processor, cause the processor to:
transition a first network functions virtualization infrastructure (NFVI) in a normal mode to a maintenance mode, responsive to receiving a request for transitioning the first NFVI to the maintenance mode from a source including a terminal, a network functions virtualization (NFV) orchestrator (NFVO), or a virtual network function (VNF) manager (VNFM) on occurrence of an event inclusive of software updating or failure detection in the first NFVI, wherein the first NFVI in the maintenance mode is excluded from NFVI selection as target of new virtual machine (VM) allocation;
instruct a first virtualization deployment unit (VDU0) serving as an active system on the first NFVI, to perform system switching between the first virtualization deployment unit (VDU0) on the first NFVI, and a second virtualization deployment unit (VDU1) serving as a standby system on a second NFVI,
in the system switching, cause the first virtualization deployment unit (VDU0) of the active system to transition to a standby system on the first NFVI and the second virtualization deployment unit (VDU1) to transition to an active system on the second NFVI;
after receiving a system switching completion notification that the first virtualization deployment unit (VDU0) and the second virtualization deployment unit (VDU1) have transitioned to serve as the standby system and the active system respectively, move the first virtualization deployment unit (VDU0) from the first NFVI set in the maintenance mode to a third NFVI;
cause the second virtualization deployment unit (VDU1) serving as the active system on the second NFVI and the first virtualization deployment unit (VDU0) serving as the standby system on the third NFVI to form a duplication system operating during a time when maintenance on the first NFVI set in the maintenance mode is performed; and
release the maintenance mode of the first NFVI when the maintenance on the first NFVI is completed.

2. The management apparatus according to claim 1, wherein the processor receives a request for releasing the maintenance mode of the first NFVI, a sending source of the second request including the terminal, via the NFVO or the VNFM.

3. The management apparatus according to claim 1, wherein, when the processor receives a fault notification from the first NFVI, the processor sends the fault notification to the NFVO directly or via the VNFM, and wherein the processor receives the request for transitioning the first NFVI to the maintenance mode, a sending source of the request including the NFVO.

4. The management apparatus according to claim 1, wherein on reception of a fault notification from the first NFVI, the processor sends the fault notification to the VNFM, and
wherein the processor receives the request for transitioning the first NFVI to the maintenance mode, a sending source of the request including the VNFM.

5. The management apparatus according to claim 3, wherein when the VNFM is notified that the first NFVI transitions to the maintenance mode, the VNFM sends the system switching instruction.

6. A network management system, comprising:
a virtualized infrastructure manager (VIM) that controls a network functions virtualization infrastructure (NFVI) on which one or more virtual machines are executed;
first, second, and third NFVIs;
a network functions virtualization (NFV) orchestrator (NFVO);
a virtual network function (VNF) manager (VNFM); and
a terminal, wherein a first virtualization deployment unit (VDU0) on the first NFVI and a second virtualization deployment unit (VDU1) on the second NFVI form a duplication system of active and standby systems, respectively,
wherein, the VIM comprises:
a processor; and
a memory storing program instructions that, when executed by the processor, cause the processor to:
on reception of a request for transitioning the first NFVI in a normal mode to a maintenance mode from the terminal, the NFVI, or the VNFM on occurrence of an event inclusive of software updating or failure detection in the first NFVI,
transition the first NFVI to the maintenance mode, wherein the first NFVI in the maintenance mode is excluded from NFVI selection as target of new virtual machine (VM) allocation, and
send a notification to the NFVO, the VNFM or the terminal,
wherein the NFVO, the VNFM or the terminal instructs, the first virtualization deployment unit (VDU0) serving as an active system on the first NFVI, to perform system switching between the first virtualization deployment unit (VDU0) on the first NFVI and the second virtualization deployment unit (VDU1) serving as a standby system on the second NFVI,
wherein the NFVO, the VNFM or the terminal receives, from the second virtualization deployment unit (VDU1), a system switching completion notification that the first virtualization deployment unit (VDU0) and the second virtualization deployment unit (VDU1) have transitioned to serve as the standby system and the active system respectively;
after receiving the system switching completion notification, move the first virtualization deployment unit (VDU0) from the first NFVI set in the maintenance mode to the third NFVI,
cause the second virtualization deployment unit (VDU1) serving as the active system on the second NFVI and the first virtualization deployment unit (VDU0) serving as a standby system on the third NFVI to form as a duplication system operating during a time when maintenance the first NFVI in the maintenance mode is performed, and after maintenance on the first NFVI is finished, responsive to a request for releasing the maintenance mode of the first NFVI, from the NFVO, the VNFM or the terminal, the processor of the VIM releases the maintenance mode of the first NFVI.

7. A management method for performing system switching between an active and standby systems on network functions virtualization infrastructures, comprising:

transitioning a first network functions virtualization infrastructure (NFVI) in a normal mode to a maintenance mode, responsive to receiving a request for transitioning the first NFVI to the maintenance mode from a source including a terminal, a network functions virtualization (NFV) orchestrator (NFVO), or a virtual network function (VNF) manager (VNFM) on occurrence of an event inclusive of software updating or failure detection in the first NFVI, wherein the first NFVI in the maintenance mode is excluded from a selection target of virtual machine (VM) allocation;

sending, to a first virtualization deployment unit (VDU0) of serving as active system on the first NFVI, an instruction for system switching between the first virtualization deployment unit (VDU0) on the first NFVI, and a second virtualization deployment unit (VDU1) serving as a standby system on a second NFVI;

in the system switching, the first virtualization deployment unit (VDU0) of the active system transitioning to a standby system on the first NFVI and the second virtualization deployment unit (VDU1) transitioning to an active system on the second NFVI;

after receiving a system switching completion notification that the first virtualization deployment unit (VDU0) and the second virtualization deployment unit (VDU1) have transitioned to serve as the standby system and the active system respectively, moving the first virtualization deployment unit (VDU0) from the first NFVI set in the maintenance mode to a third NFVI;

causing the second virtualization deployment unit (VDU1) serving as an active system on the second NFVI and the first virtualization deployment unit (VDU0) serving as a standby system on the third NFVI to form a duplication system operating during a time when maintenance on the first NFVI set in the maintenance mode is performed; and releasing the maintenance mode of the first NFVI responsive to a request for releasing the maintenance mode of the first NFVI, from the terminal, the NFVO or the VNFM, after the maintenance on the first NFVI is finished.

8. A non-transitory computer-readable recording medium storing therein a program for performing system switching between an active and standby systems on network functions virtualization infrastructures, the program causing a computer to execute processing comprising:

transitioning a first network functions virtualization infrastructure (NFVI) in a normal mode to a maintenance mode, responsive to receiving a request for transitioning the first NFVI to the maintenance mode from a source including a terminal, a network functions virtualization (NFV) orchestrator (NFVO), or a virtual network function (VNF) manager (VNFM) on occurrence of an event inclusive of software updating or failure detection in the first NFVI, wherein the first NFVI in the maintenance mode is excluded from a selection target of virtual machine (VM) allocation;

transmitting, to a first virtualization deployment unit (VDU0) serving as an active system on the first NFVI, an instruction for system switching between the first virtualization deployment unit (VDU0) on the first NFVI, and a second virtualization deployment unit (VDU1) serving as a standby system on a second NFVI;

in the system switching, causing the first virtualization deployment unit (VDU0) of the active system to transition to a standby system on the first NFVI and the second virtualization deployment unit (VDU1) to transition to an active system on the second NFVI;

after receiving a system switching completion notification that the first virtualization deployment unit (VDU0) and the second virtualization deployment unit (VDU1) have transitioned to serve as the standby system and the active system respectively, moving the first virtualization deployment unit (VDU0) from the first NFVI set in the maintenance mode to a third NFVI;

causing the second virtualization deployment unit (VDU1) serving as the active system on the second NFVI and the first virtualization deployment unit (VDU0) serving as a standby system on the third NFVI to form a duplication system operating during a time when maintenance the first NFVI set in the maintenance mode is performed; and releasing the maintenance mode of the first NFVI after the maintenance on the first NFVI is finished.

\* \* \* \* \*